US010886715B2

(12) United States Patent
Jenks

(10) Patent No.: US 10,886,715 B2
(45) Date of Patent: Jan. 5, 2021

(54) ACTUATOR CONDUIT ADAPTOR

(71) Applicant: Johnson Controls Technology Company, Plymouth, MI (US)

(72) Inventor: Russell T. Jenks, Racine, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 718 days.

(21) Appl. No.: 15/166,190

(22) Filed: May 26, 2016

(65) Prior Publication Data

US 2016/0348822 A1    Dec. 1, 2016

Related U.S. Application Data

(60) Provisional application No. 62/167,160, filed on May 27, 2015.

(51) Int. Cl.
| | |
|---|---|
| *F16L 37/252* | (2006.01) |
| *F16L 37/113* | (2006.01) |
| *H02G 3/06* | (2006.01) |
| *F24F 13/02* | (2006.01) |

(52) U.S. Cl.
CPC .......... *H02G 3/0691* (2013.01); *F16L 37/113* (2013.01); *F16L 37/252* (2013.01); *F24F 13/0209* (2013.01); *H02G 3/0658* (2013.01)

(58) Field of Classification Search
CPC ....... F16L 31/00; F16L 33/00; F16L 2201/10; F16L 37/252; F16L 37/113
USPC ...................... 285/39, 93, 360–361, 401–402
See application file for complete search history.

(56) References Cited

U.S. PATENT DOCUMENTS

| | | | | |
|---|---|---|---|---|
| 1,650,996 A | * | 11/1927 | McDonnell | H01H 85/30 116/319 |
| 3,162,470 A | | 12/1964 | Davidson et al. | |
| 4,401,050 A | * | 8/1983 | Britt | A62B 3/00 116/205 |
| 4,443,028 A | * | 4/1984 | Hayes | F16L 37/252 285/110 |
| 4,844,000 A | * | 7/1989 | Clement | A62B 3/00 116/205 |

(Continued)

OTHER PUBLICATIONS

International Search Report and Written Opinion for PCT application No. PCT/US2016/034484, dated Oct. 14, 2016, 17 pages.

*Primary Examiner* — Zachary T Dragicevich
*Assistant Examiner* — Fannie C Kee
(74) *Attorney, Agent, or Firm* — Foley & Lardner LLP

(57) ABSTRACT

A conduit adaptor for an HVAC component includes a body having a substantially cylindrical shape, a first end configured to fit at least partially within the HVAC component, and a second end configured to couple to a conduit. The body is rotatable relative to the HVAC component between an unlocked position and a locked position when the first end is inserted into the HVAC component. The body further includes a bore extending axially through the body from the first end to the second end, and a first tab and a second tab extending radially outward from the first end. The first tab and the second tab are configured to prevent the body from being removed from the HVAC component when the body is in the locked position. The first tab includes a retention feature configured to retain the body in the locked position.

19 Claims, 25 Drawing Sheets

(56) References Cited

U.S. PATENT DOCUMENTS

| | | | | |
|---|---|---|---|---|
| 5,215,336 A | * | 6/1993 | Worthing | F16L 19/005 285/319 |
| 5,462,311 A | * | 10/1995 | Cipolla | A47L 9/244 285/24 |
| 5,623,890 A | * | 4/1997 | Lenske | A62B 3/00 116/205 |
| 5,775,744 A | * | 7/1998 | Smith, III | F16L 37/08 285/396 |
| 6,254,303 B1 | * | 7/2001 | Falat | B23B 31/113 403/321 |
| 6,595,556 B1 | * | 7/2003 | Zenko | F16L 37/008 285/140.1 |
| 7,100,948 B2 | * | 9/2006 | Guest | F16L 19/086 285/322 |
| 2002/0011730 A1 | * | 1/2002 | Stickan | F16L 37/107 285/93 |
| 2012/0169044 A1 | * | 7/2012 | Kendrick | A61M 16/0816 285/313 |
| 2013/0046287 A1 | * | 2/2013 | Davis | A61M 39/10 604/535 |
| 2014/0300099 A1 | | 10/2014 | Lehmann et al. | |

\* cited by examiner

DETAIL A

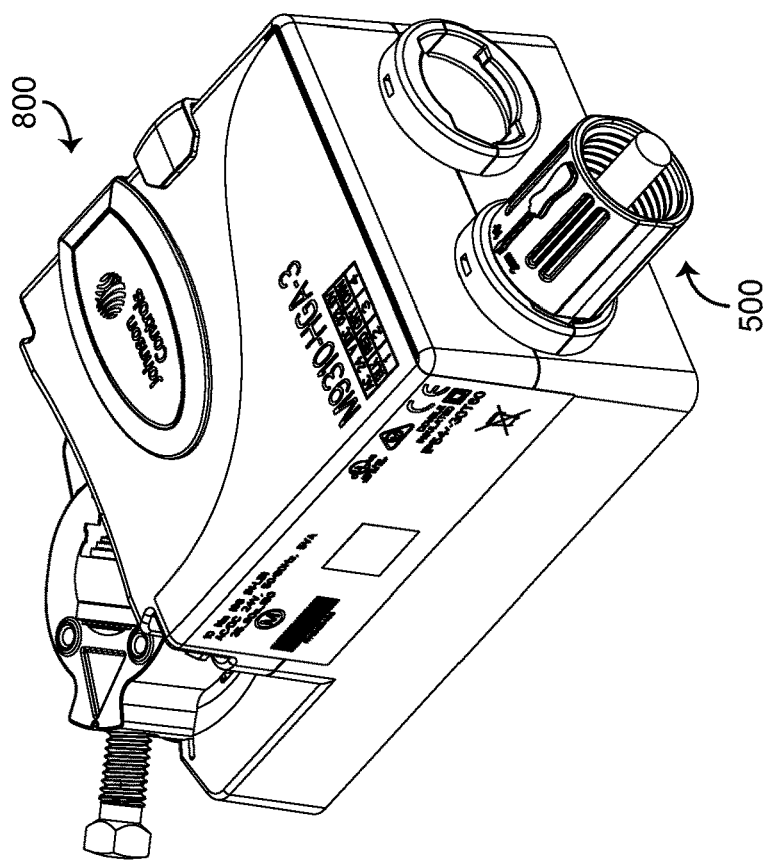
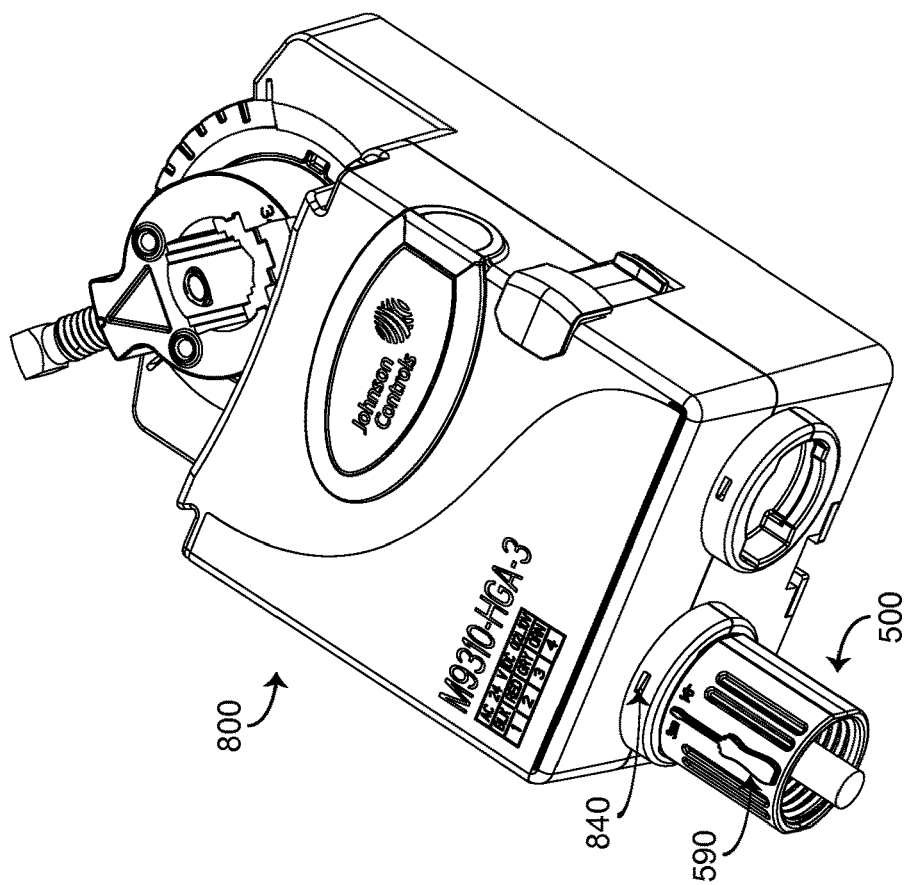
FIG. 15B
FIG. 15A

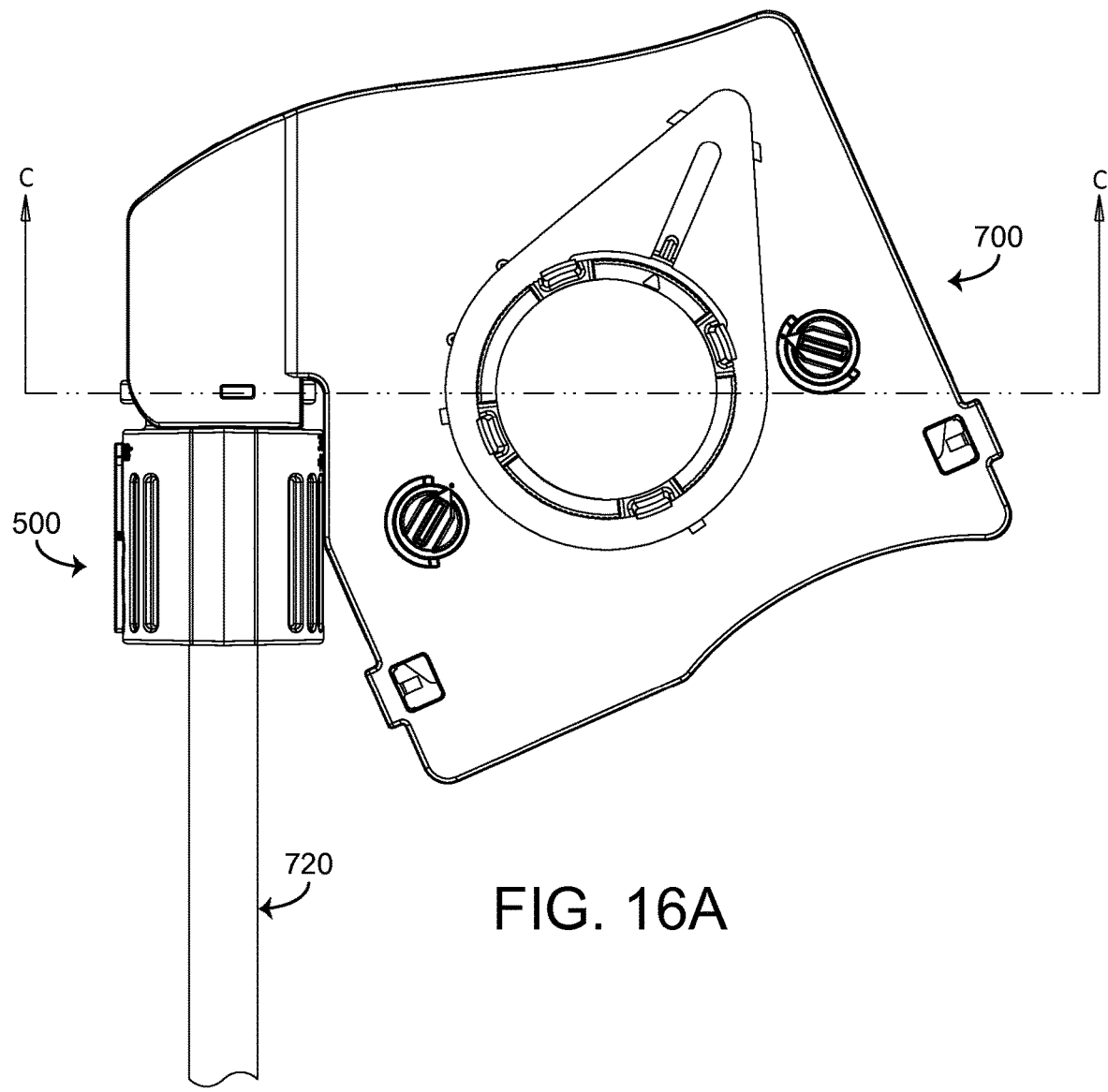
FIG. 16A
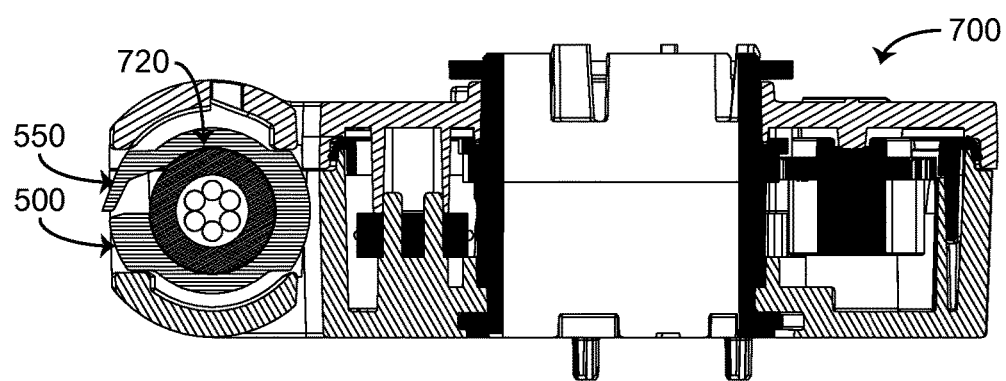
SECTION C-C  FIG. 16B

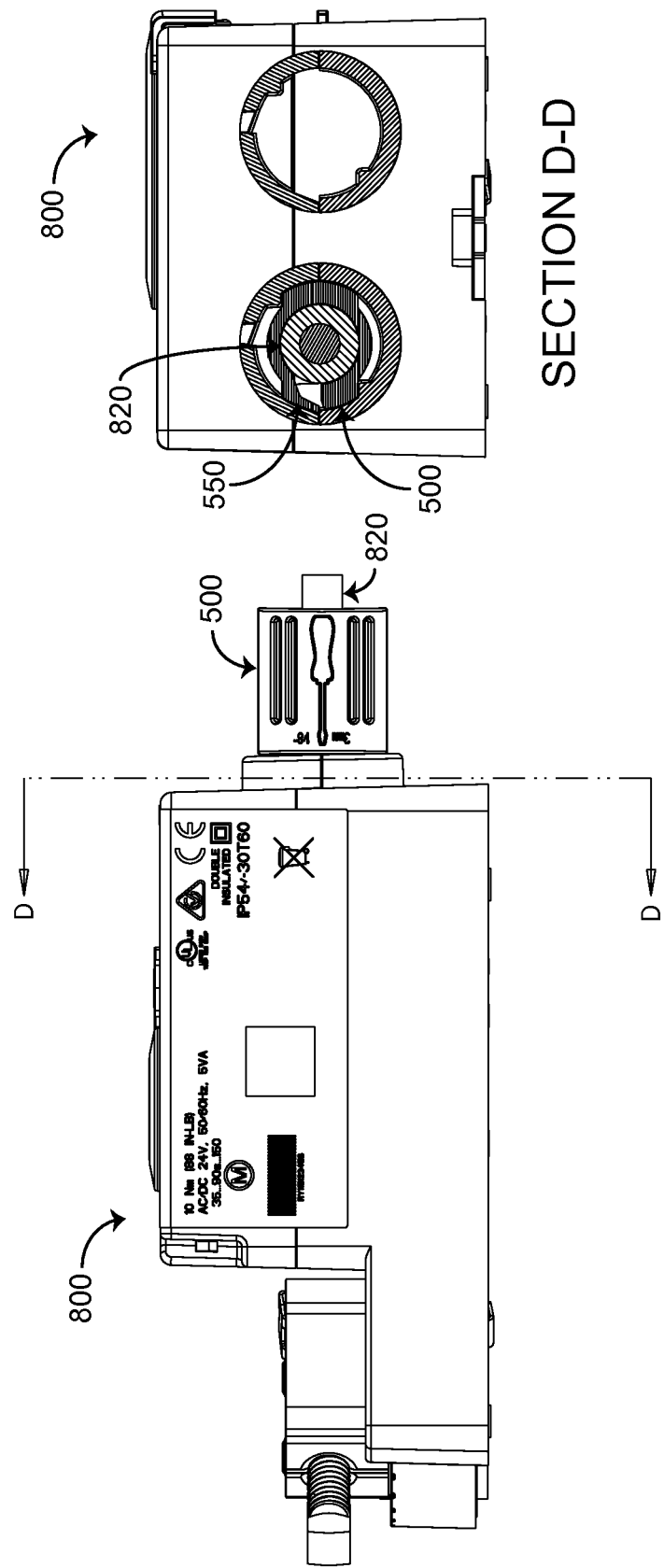

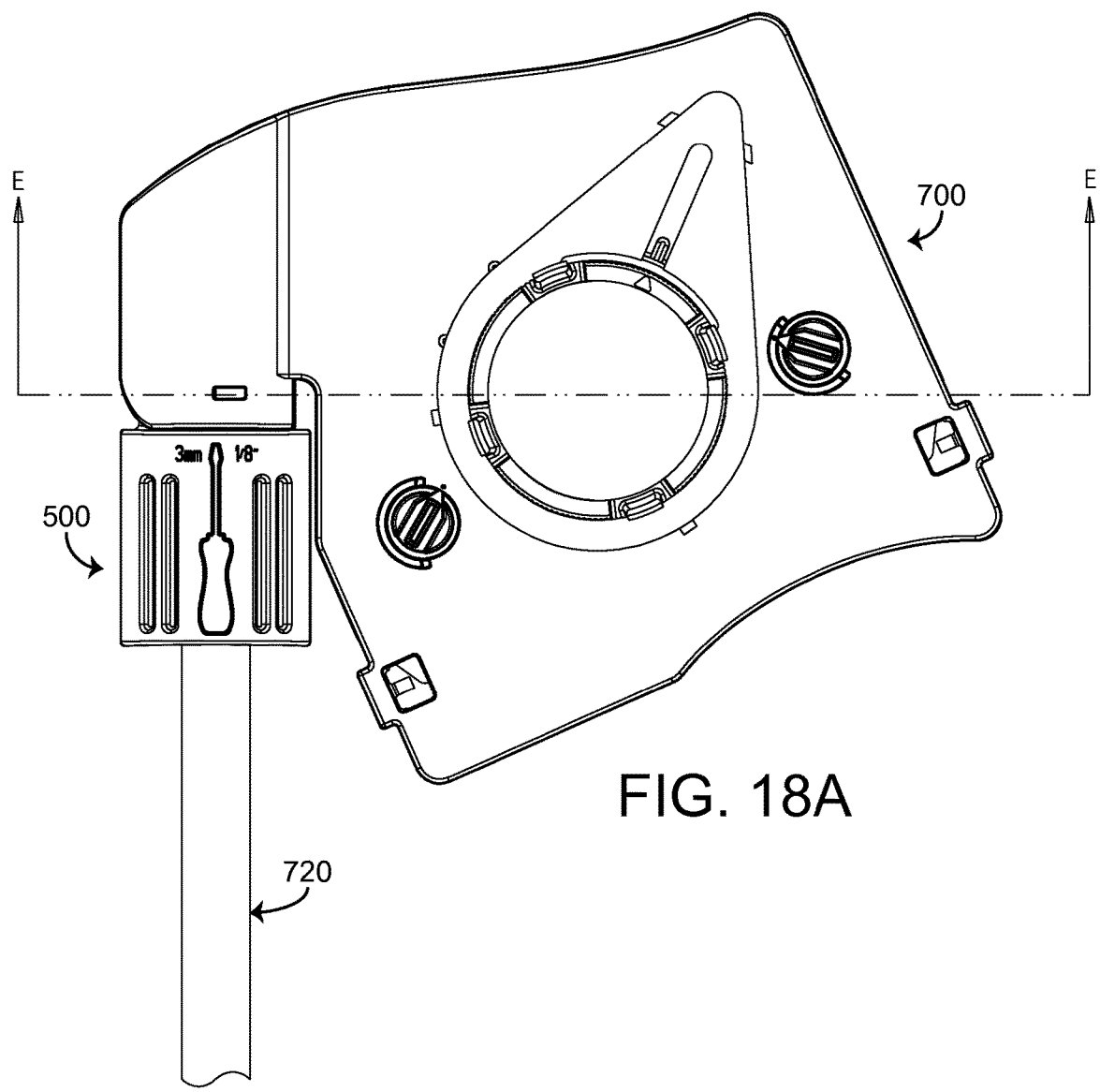
FIG. 18A
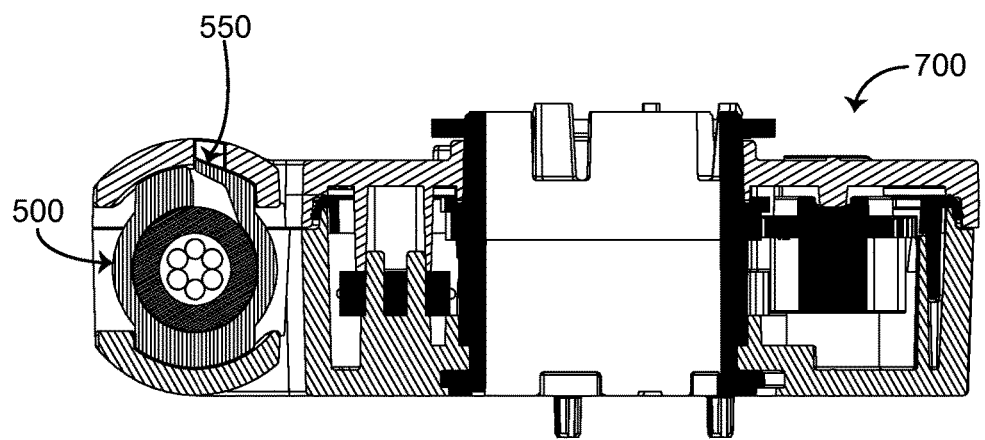
SECTION E-E  FIG. 18B

SECTION F-F

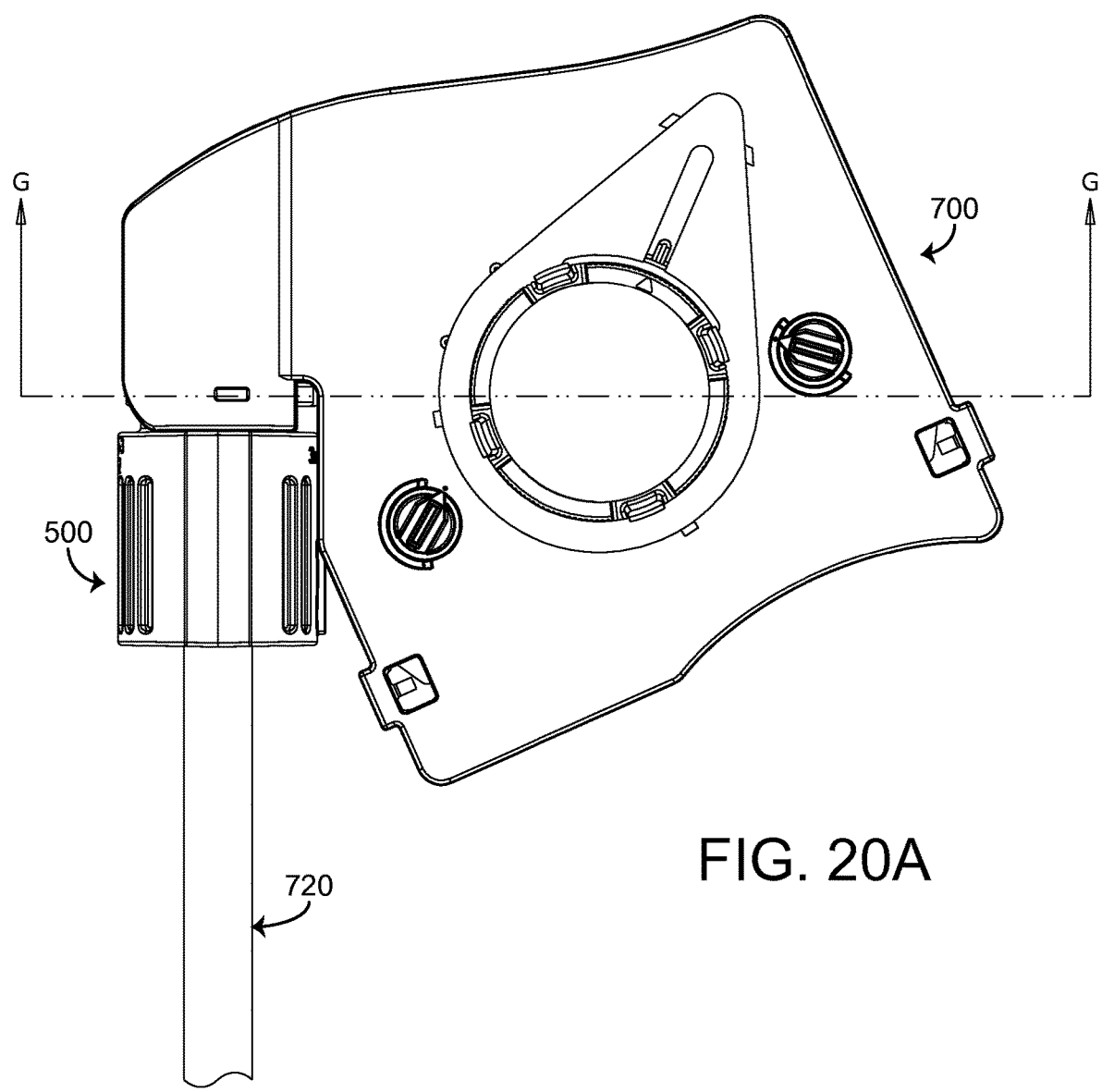
FIG. 20A
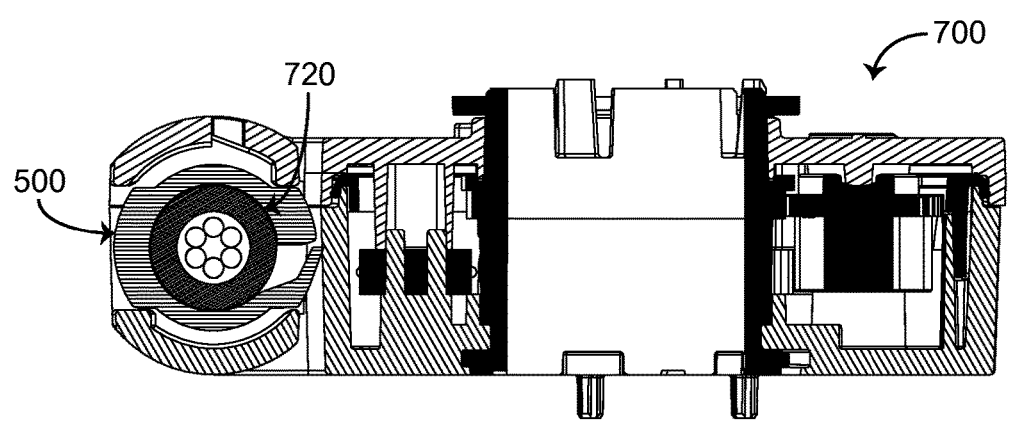
SECTION G-G   FIG. 20B

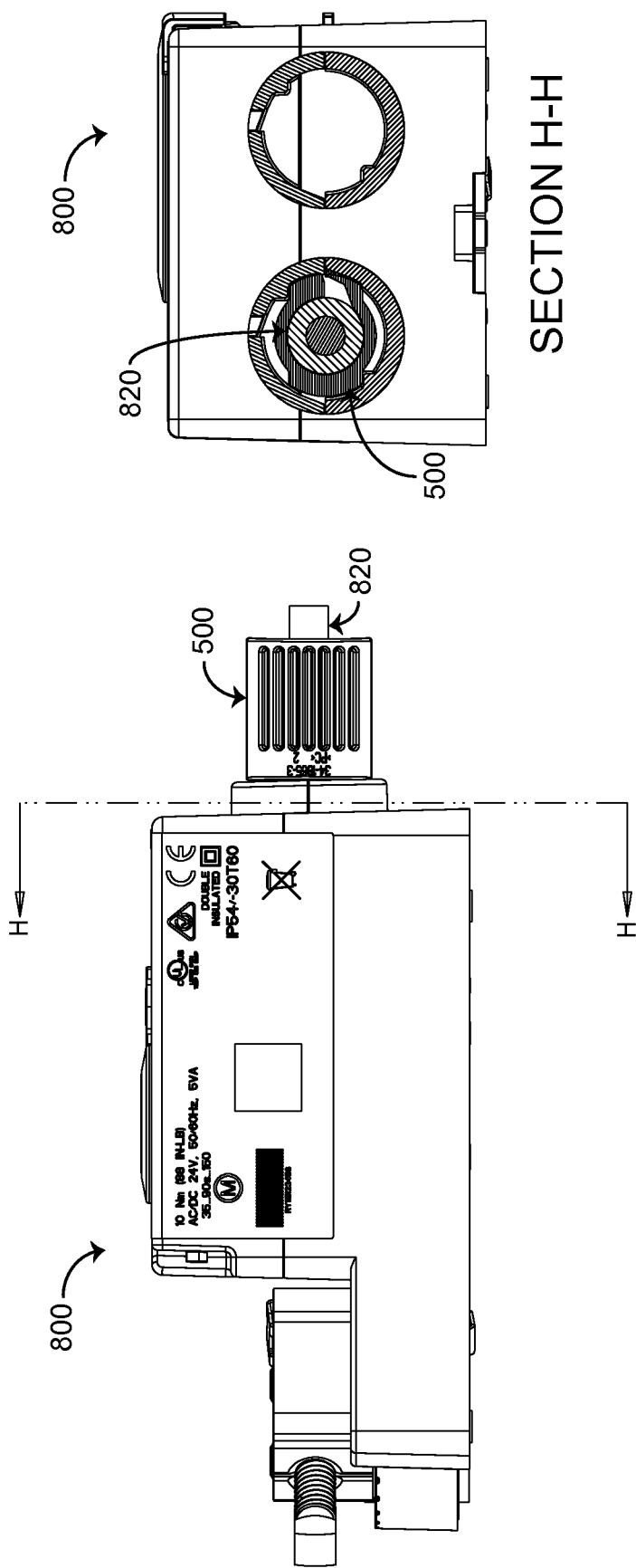

ACTUATOR CONDUIT ADAPTOR

CROSS-REFERENCE TO RELATED PATENT APPLICATION

This application claims the benefit of and priority to U.S. Provisional Patent Application No. 62/167,160 filed May 27, 2015, the entire disclosure of which is incorporated by reference herein.

BACKGROUND

The present application relates generally to the field of accessories for HVAC components. The present application relates more specifically to an adaptor used to couple a conduit to an actuator or other HVAC component.

HVAC components and accessories may include an input and/or output cable. A user may wish to install a metal conduit over this cable for several reasons, including to protect the cable and to comply with various regulations for line voltage products. However, current HVAC components and accessories may not contain provisions for coupling the conduit to the HVAC component. Accordingly, there is a need for an adaptor that easily installs onto the HVAC component and facilitates this coupling.

SUMMARY

One implementation of the present disclosure is a conduit adaptor for an HVAC component. The conduit adaptor includes a body having a substantially cylindrical shape, a first end configured to fit at least partially within the HVAC component, and a second end configured to couple to a conduit. The body is rotatable relative to the HVAC component between an unlocked position and a locked position when the first end is inserted into the HVAC component. The body further includes a bore extending axially through the body from the first end to the second end, and a first tab and a second tab extending radially outward from the first end. The first tab and the second tab are configured to prevent the body from being removed from the HVAC component when the body is in the locked position. The first tab includes a retention feature configured to retain the body in the locked position.

In some embodiments, the first tab extends radially outward from the first end by a first radial distance, and the second tab extends radially outward from the first end by a second radial distance different from the first radial distance. In other embodiments, the first radial distance is larger than the second radial distance.

In some embodiments, the different radial distances by which the first tab and the second tab extend from the first end allow the body to be rotated into the locked position when the body is inserted into the HVAC component in a first orientation. The different radial distances also prevent the body from being rotated into the locked position when the body is inserted into the HVAC component in a second orientation opposite the first orientation.

In some embodiments, the second end includes a threaded portion.

In some embodiments, the retention feature is configured to deflect radially inward when the body is rotated between the unlocked position and the locked position. The retention feature is also configured to spring radially outward such that the retention feature extends at least partially into a radial aperture of the HVAC component when the body is in the locked position, the retention feature engaging a surface of the radial aperture to retain the body in the locked position. In other embodiments, the retention feature is further configured to deflect radially inward when compressed by a tool inserted through the radial aperture of the HVAC component such that the retention feature disengages the surface of the radial aperture and allows the body to rotate into the unlocked position to remove the first end from the HVAC component.

In some embodiments, the first tab further includes a bottoming surface configured to limit an amount by which the retention feature can deflect radially inward to protect the retention feature from plastic deformation or fracture.

In some embodiments, the body comprises an external face including a feature indicating at least one of a shape, size, or type of the tool configured to fit within the radial aperture of the HVAC component. In other embodiments, the body comprises an external face including features configured to facilitate grip.

Another implementation of the present disclosure is a conduit adaptor for an HVAC component. The conduit adaptor includes a body having a substantially cylindrical shape, a first end configured to fit at least partially within the HVAC component, and a second end configured to couple to a conduit. The body is rotatable relative to the HVAC component between an unlocked position and a locked position when the first end is inserted into the HVAC component. The body further includes a bore extending axially through the body from the first end to the second end, a first tab and a second tab extending radially outward from the first end. The first tab and the second tab are configured to prevent the body from being removed from the HVAC component when the body is in the locked position. The adaptor further includes at least one indicator feature extending radially outward from an external face of the body and indicating how to disengage the body from the HVAC component.

In some embodiments, the indicator feature has a shape identifying a tool configured to remove the first end from the HVAC component. In other embodiments, the tool is a screwdriver.

In some embodiments, the indicator feature includes text describing at least one of a size and type of a tool configured to remove the first end from the HVAC component. In other embodiments, the indicator feature is configured to physically prevent the first end from being inserted into the HVAC component in an incorrect orientation by engaging a surface of the HVAC component. The indicator feature is also configured to allow the body to be inserted into the HVAC component in a correct orientation opposite the incorrect orientation.

In some embodiments, the second end includes a threaded portion.

Another implementation of the present disclosure is a system for coupling a conduit to an actuator. The system includes an actuator, a conduit, and an actuator conduit adaptor configured to fit at least partially within the actuator and rotate relative to the actuator between an unlocked position and a locked position when inserted into the actuator. The actuator conduit adaptor includes a retention feature configured to retain the actuator conduit adaptor in the locked position. The actuator includes an aperture configured to receive the retention feature.

In some embodiments, the system further includes a conduit connector. In other embodiments, the conduit is a flexible metal conduit.

In some embodiments, the actuator conduit adaptor comprises a first tab and a second tab extending radially outward from the actuator conduit adaptor and configured to prevent the actuator conduit adaptor from being removed from the actuator when the actuator conduit adaptor is in the locked position.

BRIEF DESCRIPTION OF THE DRAWINGS

FIG. 15A-15B is an illustration of the actuator conduit adaptor of FIGS. 1-2 installed onto the actuator conduit and rotated to lock the conduit adaptor in place, according to an example embodiment.

FIGS. 16A-16B are images of the actuator conduit adaptor aligned with an actuator adaptor kit, and a cross-sectional view of the actuator adaptor kit along the line labeled "C-C," according to an example embodiment.

FIGS. 17A-17B are images of the actuator conduit adaptor aligned with an actuator, and a cross-sectional view of the actuator along the line labeled "D-D," according to an example embodiment.

FIGS. 18A-18B are images of the actuator conduit adaptor installed onto the actuator adaptor kit and rotated to lock the conduit adaptor in place, and a cross-sectional view of the actuator adaptor kit along the line labeled "E-E," according to an example embodiment.

FIGS. 20A-20B are images of the actuator conduit adaptor rotated clockwise 90 degrees from the installed and locked position on the adaptor kit, and a cross-sectional view of the actuator adaptor kit along the line labeled "G-G," according to an example embodiment.

FIGS. 21A-21B are images of the actuator conduit adaptor rotated clockwise 90 degrees from the installed and locked position on the actuator, and a cross-sectional view of the actuator adaptor kit along the line labeled "H-H," according to an example embodiment.

DETAILED DESCRIPTION

Figure 2:
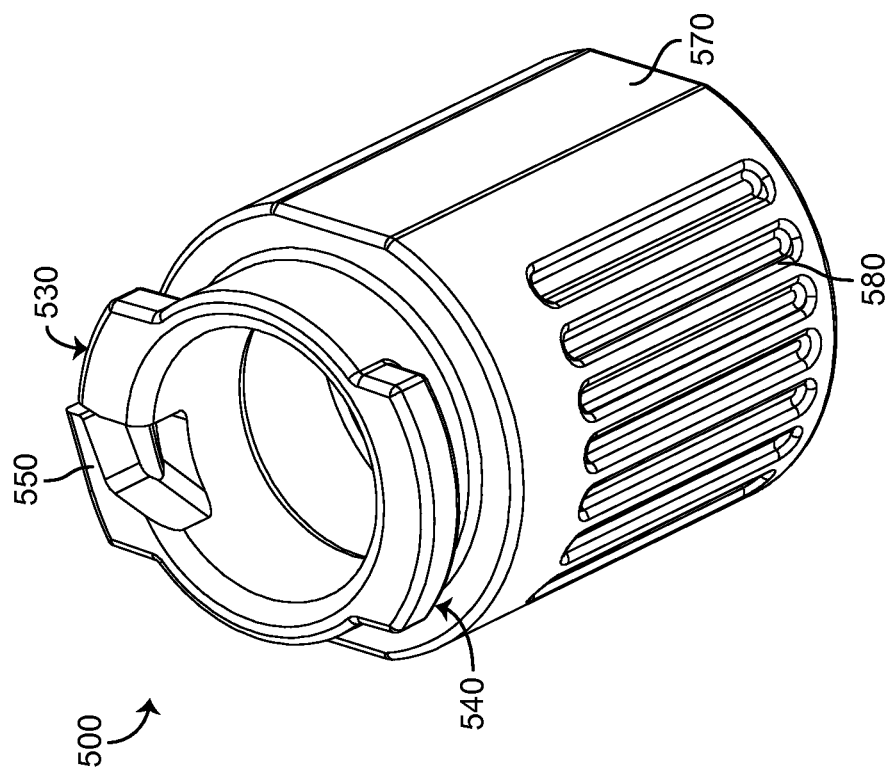
FIGS. 1-2 are perspective views of an actuator conduit adaptor, according to an example embodiment.

Referring generally to the FIGURES, an actuator conduit adaptor is shown, according to an exemplary embodiment. The actuator conduit adaptor described herein may be used in conjunction with an actuator in a HVAC system, building management system (BMS), or other systems that use an actuator to control equipment. An exemplary HVAC system and BMS in which the actuator may be implemented are described in greater detail with reference to FIGS. 26-29.

Actuator Conduit Adaptor

Referring now to FIGS. 1-4, several views of actuator conduit adaptor 500 are shown, according to an example embodiment. Conduit adaptor 500 may be configured to couple to the housing of an HVAC component such as an actuator (e.g., HVAC component 800) or an HVAC component accessory (e.g., adaptor kit 700). For example, conduit adaptor 500 may attach to actuator 800 by inserting a coupling portion of conduit adaptor 500 into a recess of actuator 800 and rotating conduit adaptor 500 (e.g., by 90 degrees) to lock conduit adaptor 500 in place relative to actuator 800. Once conduit adaptor 500 has been coupled to an HVAC component or accessory, adaptor 500 may facilitate attaching a conduit (e.g., a flexible metal conduit) to the actuator. Attachment of a conduit will be described in greater detail in relation to FIGS. 23A-25 below.

Still referring to FIGS. 1-4, adaptor 500 is shown to have a partially cylindrical body shape, terminating at a first end 510 and a second end 520. First end 510 may include first tab 530 and second tab 540 extending radially from the center of the body. First tab 530 and second tab 540 may be sized to fit within a corresponding feature (e.g., a groove, recess, etc.) of an HVAC component or an HVAC component accessory in order to retain adaptor 500. In some embodiments, first tab 530 and second tab 540 have different diameters when measured from the center point of adaptor 500. The use of different tab diameters may be employed such that first tab 530 may not fit into a recess intended for second tab 540 and vice versa, thus preventing conduit adaptor 500 from being assembled incorrectly.

In some embodiments, first tab 530 further includes retention clip 550. In some embodiments, retention clip 550 may be a pronged protrusion from first tab 530 with springlike features. When adaptor 500 is first inserted into an HVAC component or an HVAC component accessory, retention clip 550 may be compressed toward the center of adaptor 500 to allow the adaptor to freely rotate within the HVAC component or accessory. However, when adaptor 500 is rotated into the fully installed position, retention clip 550 may spring outward, out of its compressed state, to extend into an aperture of the HVAC component or accessory and prevent adaptor 500 from further rotation, thereby retaining adaptor 500 within the HVAC component or accessory.

Turning now to second end 520, actuator conduit adaptor 500 may include threads 560 which are configured to threadably couple to a conduit (e.g., flexible metal conduit 800) or a conduit adaptor (e.g., threaded conduit fitting 810). In various embodiments, threads 560 may be sized to match the threads of any size conduit or conduit fitting. Threads 560 may be formed according to any thread standard (e.g., National Pipe Straight Mechanical (NPSM) threads, Unified Thread Standard (UTS) threads, metric ISO screw threads, etc.). In some embodiments, threads 560 may not be threads, but instead may be any feature included at second end 520 to retain a conduit or conduit fitting (e.g., snap feature, quick connect-disconnect feature, etc.).

In some embodiments, conduit adaptor 500 may include features intended to facilitate ease of installation for the user. For example, these features may include flat sides 570 on the otherwise cylindrically-shaped exterior face of adaptor 500. The presence of flat sides 570 may direct the user to grasp adaptor 500 at these points during the installation process. Though depicted in FIGS. 1-4 as two parallel faces, in various embodiments, conduit adaptor 500 may include a plurality of flat sides 570. Adaptor 500 may further include recessed grip features 580 on the outer faces of adaptor 500 to prevent slipping as the user rotates adaptor 500 in or out of the HVAC component or accessory. The shape of grip features 580 depicted in FIGS. 1-4 comprise merely one embodiment, and may be any desired shape or size. Similarly, though grip features 580 are depicted as recessed cavities within the exterior face of adaptor 500, in other embodiments, grip features 580 may be extruded bosses protruding from the exterior face of adaptor 500.

Figure 1:
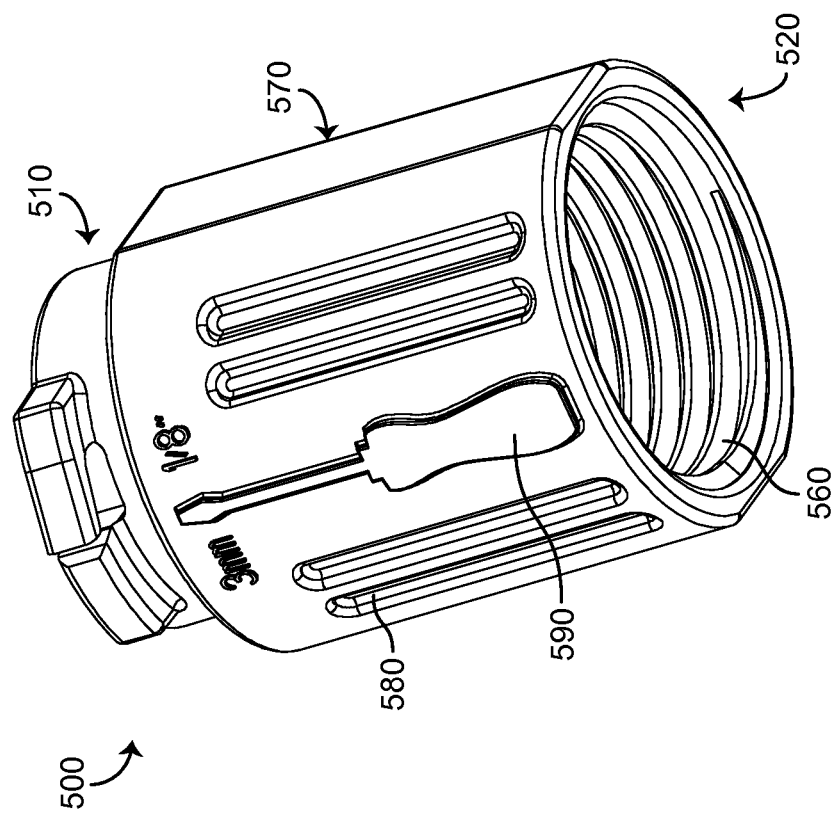
Figure 4:
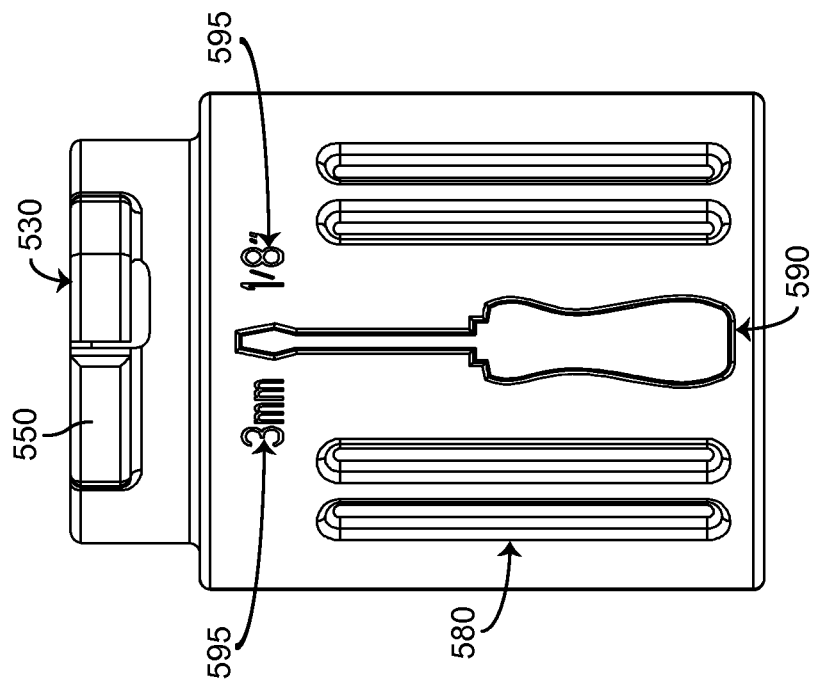
FIG. 4 is a rear view of the actuator conduit adaptor of FIGS. 1-2, according to an example embodiment.
Figure 3:
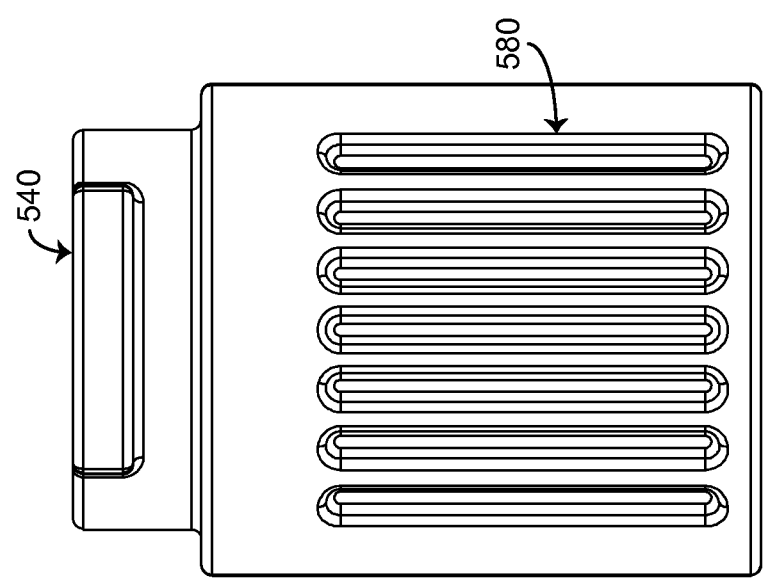
FIG. 3 is a front view of the actuator conduit adaptor of FIGS. 1-2, according to an example embodiment.

Conduit adaptor 500 may further include assembly protrusion 590. Although depicted in the shape of a flathead screwdriver in FIGS. 1 and 4, assembly protrusion 590 may be formed in any desired shape. Assembly protrusion 590 may serve several functions in the installation of conduit adaptor 500. One function of assembly protrusion 590 may be to indicate the type of tool required to remove conduit adaptor 500 from its locked position after it has been installed into HVAC component 800 or adaptor kit 700. For example, as depicted in FIGS. 1 and 4, the shape of assembly protrusion 590 indicates that a flathead screwdriver may be utilized as a removal tool. Indicator protrusions 595 may additionally be extruded near assembly protrusion 590 to convey information about the removal tool (e.g., the required screwdriver size, "3 mm" and "⅛'"") or any other additional information regarding adaptor 500 (e.g., thread size of threaded portion 560). Another function of assembly protrusion 590 may be to prevent adaptor 500 from incorrect installation. For example, the extrusion height of assembly protrusion 590 may be selected such that protrusion 590 interferes with a feature of the HVAC component or accessory in certain orientations, and adaptor 500 is thereby prevented from rotating into a fully installed position in the HVAC component or accessory if a user attempts to install adaptor 500 in the wrong orientation.

Still referring to FIGS. 1-4, conduit adaptor 500 may be formed or constructed from a variety of materials and in a variety of manners. For example and in one embodiment, adaptor 500 may be of unitary construction (i.e., all one piece), where adaptor 500 may be molded, extruded, cast, formed/machined etc. In another embodiment, first end 510 and second end 520 may be fabricated as separate components. As such, first end 510 and second end 520 may be joined by any suitable manner (e.g., a bonding agent, a fastener such as a set screw, a combination thereof, etc.) to form a stacked structure. Accordingly, adaptor 500 may be constructed from any suitable material, including, but not limited to, plastic, composites, metal, metal alloys, and/or any combination thereof.

Figure 5:
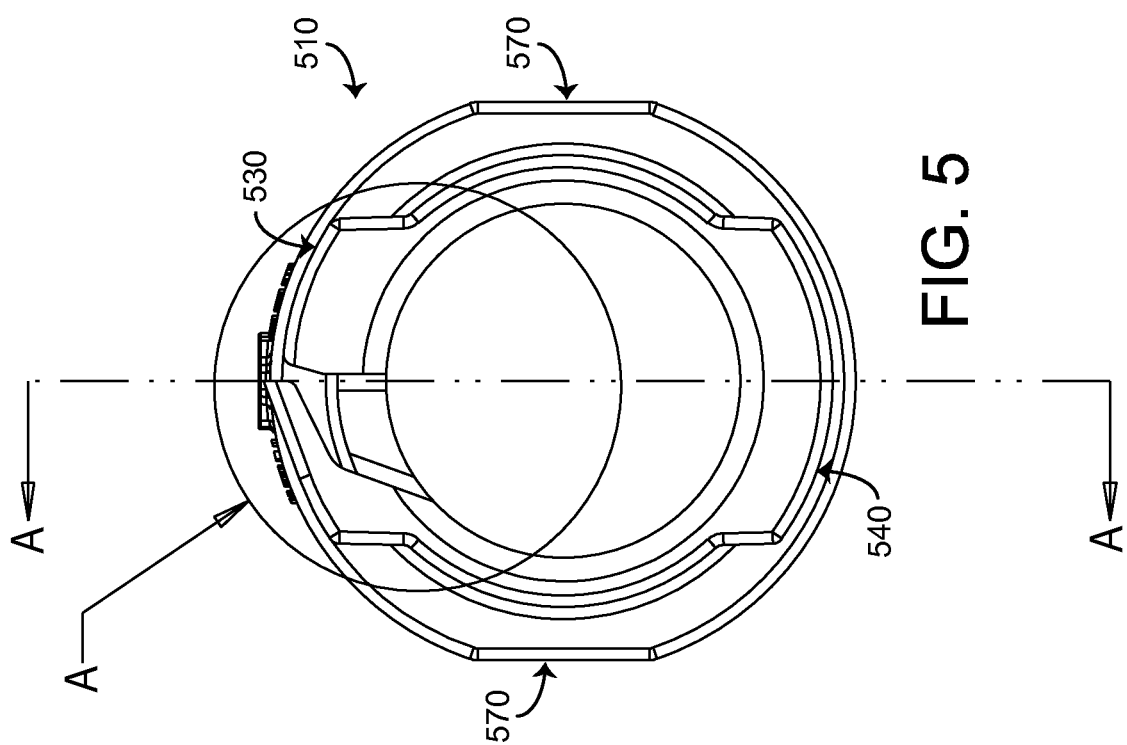
FIG. 5 is a top view of the actuator conduit adaptor of FIGS. 1-2, according to an example embodiment.

Referring now to FIG. 5, a top view of conduit adaptor 500 is shown, according to an example embodiment. The top view of adaptor 500 shows first end 510 in greater detail, including first tab 530 and second tab 540. As previously described, in some embodiments, first tab 530 and second tab 540 may have different diameters (e.g., first tab 530 may have a larger diameter than second tab 540, as depicted in FIG. 5) when measured from the center point of adaptor 500 in order to facilitate proper installation orientation.

Figure 6:
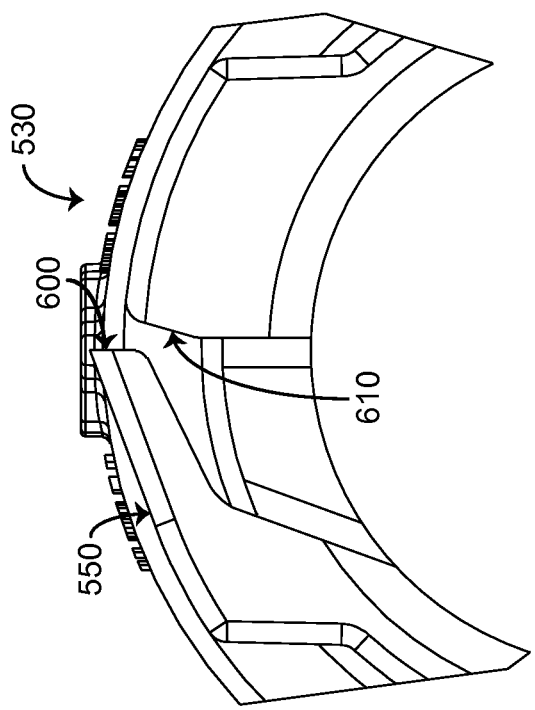
FIG. 6 is another top view of the actuator conduit adaptor of FIGS. 1-2, illustrating the portion labeled "DETAIL A" in FIG. 5 in greater detail, according to an example embodiment.

Turning now to FIG. 6, a top view of conduit adaptor 500 showing first tab 530 according to detail view "A" of FIG. 5 shown, according to an example embodiment. First tab 530 includes retention clip 550, depicted here in an extended position. When adaptor 500 is fully installed in an HVAC component or accessory, retention clip 550 may snap into this extended position to retain adaptor 500 within the HVAC component or accessory and prevent subsequent rotation of adaptor 500. Retention clip 550 further includes retention clip terminating face 600. When retention clip 550 is compressed, either by a feature of the HVAC component or accessory during installation, or by a tool when a user seeks to remove adaptor 500 from the HVAC component or accessory, terminating face 600 will travel vertically downward until it comes into contact with bottoming surface 610. Bottoming surface 610 may be included in first tab 530 to protect retention clip 550 against overcompression. In other words, bottoming surface 610 may inhibit terminating face 600 from traveling vertically downward past elastic material limits in the presence of a compressive force that would otherwise result in plastic deformation or fracture of retention clip 550.

Figure 8:
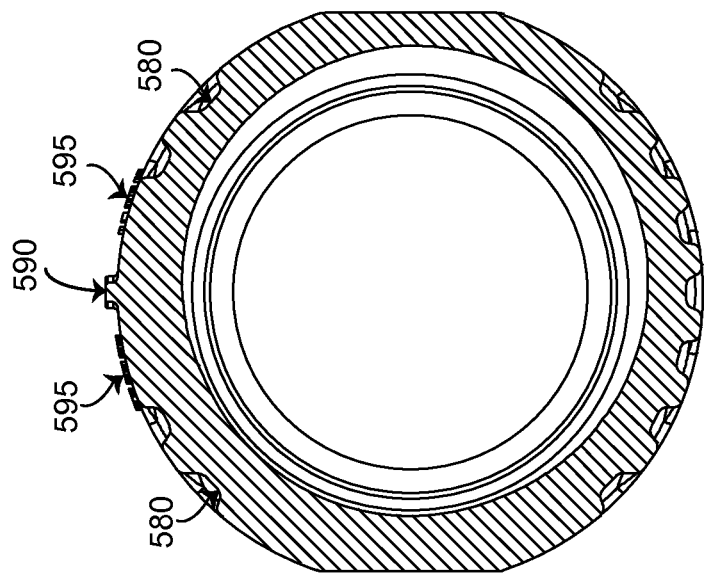
FIG. 8 is a cross-sectional view of the actuator conduit adaptor of FIGS. 1-2 taken along the line labeled "B-B" in FIG. 7, according to an example embodiment.
Figure 7:
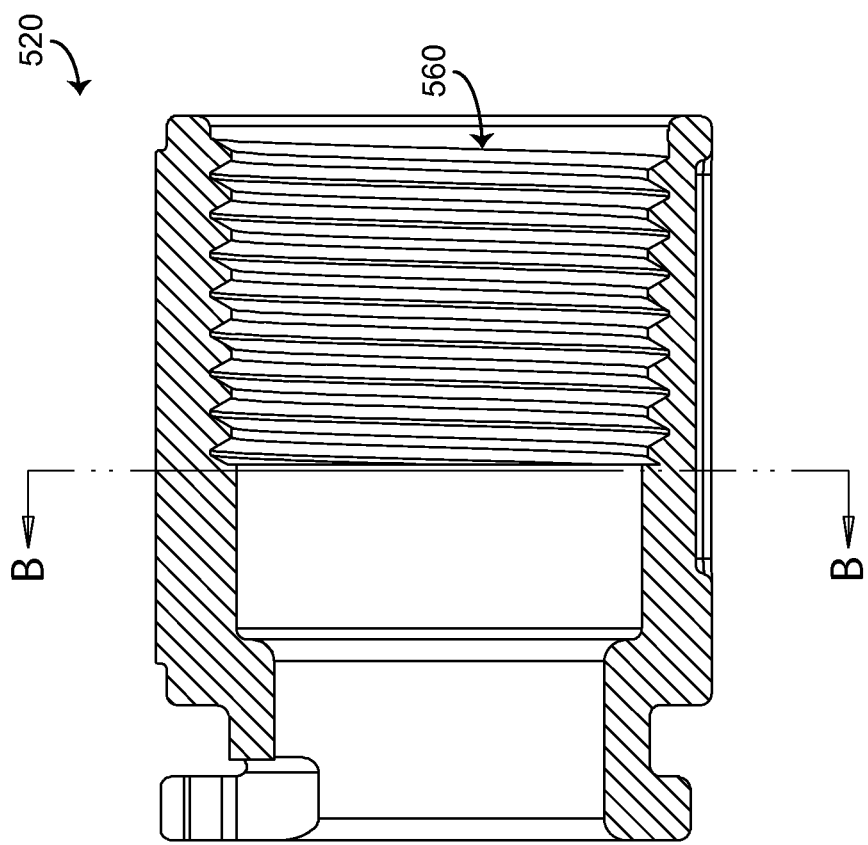
FIG. 7 is a cross-sectional view of the actuator conduit adaptor of FIGS. 1-2 taken along the line labeled "A-A" in FIG. 5, according to an example embodiment.
Figure 9:
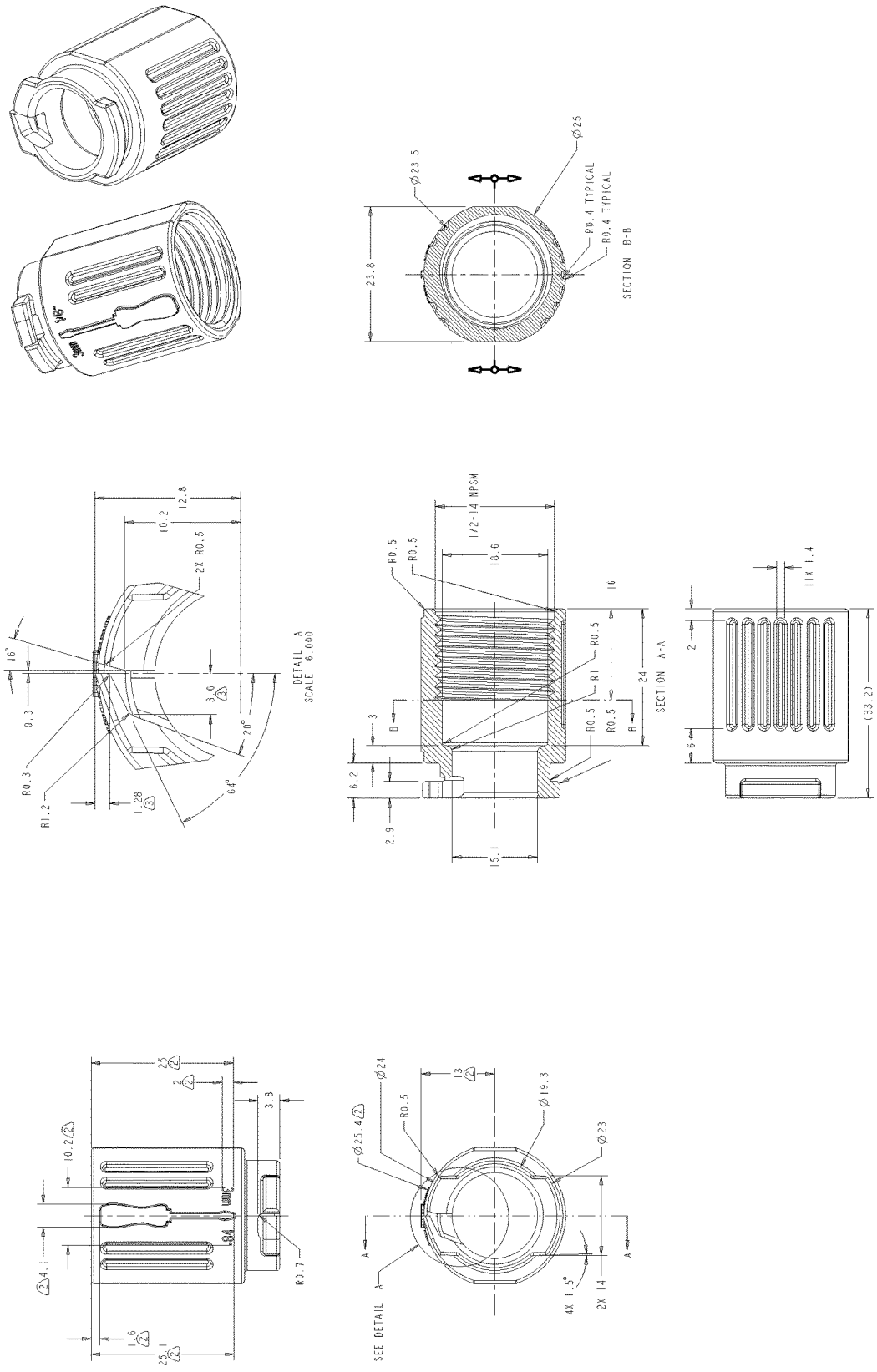
FIG. 9 is a projection drawing sheet illustrating several views of the actuator conduit adaptor of FIGS. 1-2, according to an example embodiment.

Referring now to FIG. 7, a side cross-sectional view of conduit adaptor 500 taken along the line labeled "A-A" in FIG. 5 is shown, according to an example embodiment. As was depicted in FIG. 1, adaptor 500 may include threaded portion 560. Threaded portion 560 may extend from second end 520 to span roughly half the overall length of adaptor 550, as depicted in FIG. 7. In other embodiments, the length of threaded portion 560 may be adapted to suit the requirements of the conduit and/or conduit adaptor that threadably couples with threaded portion 560. Referring now to FIG. 8, a cross-sectional view of conduit adaptor 500 taken along the line labeled "B-B" of FIG. 7 is shown, according to an example embodiment. As previously described, assembly protrusion 590 and indicator protrusions 595 are extruded from the external face of adaptor 500, whereas grip features 580 are recessed into the external face. Finally, turning now to FIG. 9, dimensioned versions of FIGS. 1-8 are represented as a sample engineering drawing. These dimensions are merely intended to represent a sample embodiment of the invention, and are not intended to be limiting.

Figure 10:
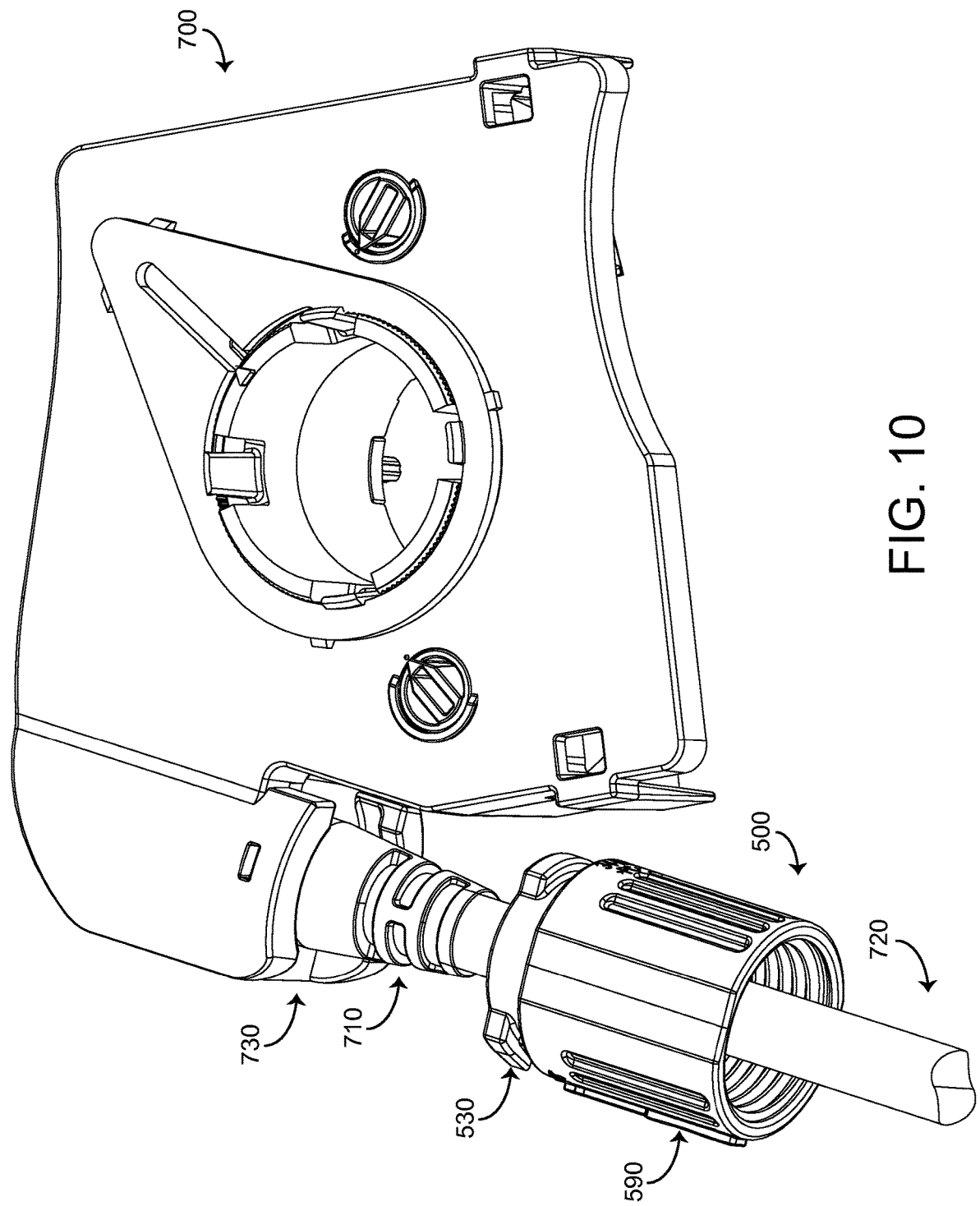
FIGS. 10-11 are images of the actuator conduit adaptor of FIGS. 1-2 aligned with an actuator adaptor kit, according to an example embodiment.
Figure 11:
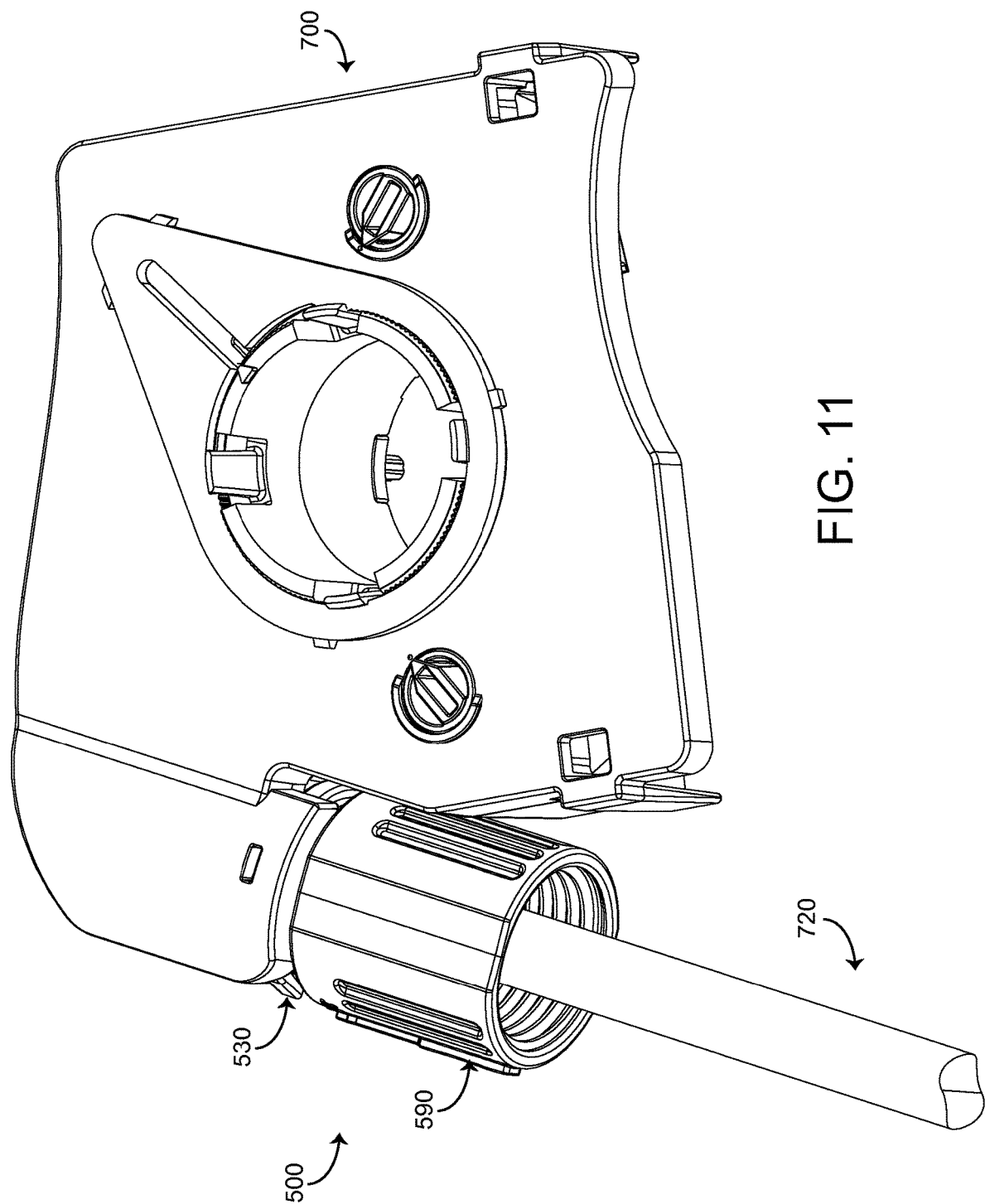
Figure 12:
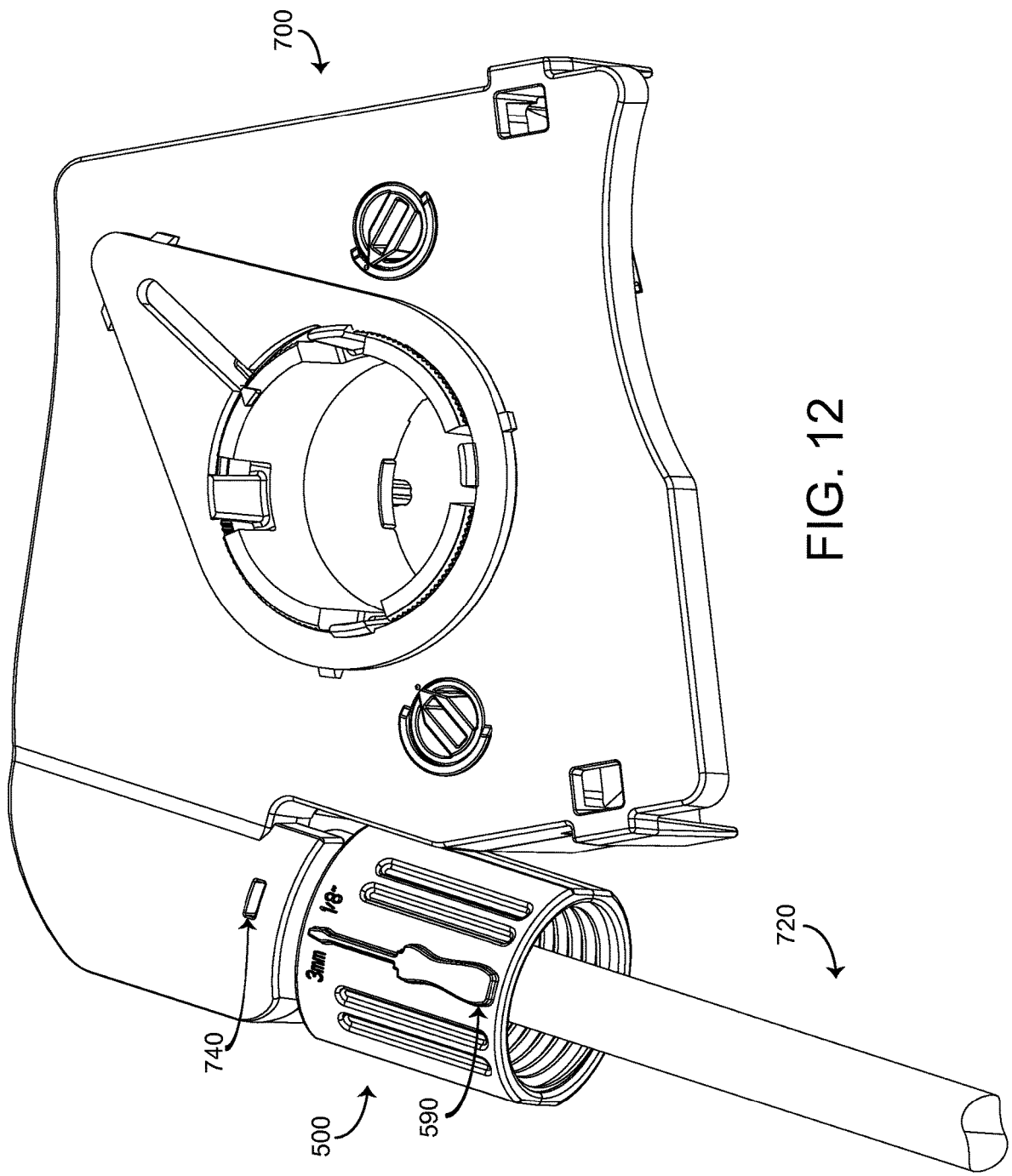
FIG. 12 is an illustration of the actuator conduit adaptor of FIGS. 1-2 installed onto the actuator adaptor kit and rotated to lock the conduit adaptor in place, according to an example embodiment.

Referring now to FIGS. 10-12, multiple views of conduit adaptor 500 in various assembly states are shown, according to various embodiments. FIG. 10 depicts HVAC accessory kit 700, with HVAC accessory cable 720 providing input and/or output to accessory 700. Accessory cable overmold 710 may protrude from HVAC accessory recess 730 to provide strain relief for accessory cable 720. As shown in FIGS. 10-11, the geometry of conduit adaptor 500 (i.e., the bore through the center of the part) allows the adaptor to fit over cable overmold 710 and into assembly recess 730. Referring now to FIG. 12, conduit adaptor 500 may be rotated by a quarter turn (e.g., 90 degrees) to lock the conduit adaptor in place relative to HVAC accessory kit 700. As will be described in further detail below, rotating adaptor 500 a quarter turn aligns first tab 530 with HVAC accessory aperture 740, permitting retention clip 550 to snap into aperture 740. The expansion of retention clip 550 into aperture 740 provides a positive stop which prevents adaptor 500 from further rotation. Locking adaptor 500 into a fully installed position also aligns assembly protrusion 590 with aperture 740, providing a convenient visual indication of the tool required to be inserted into aperture 740 in order to remove conduit adaptor 500 from HVAC accessory kit 700.

Figure 13B:
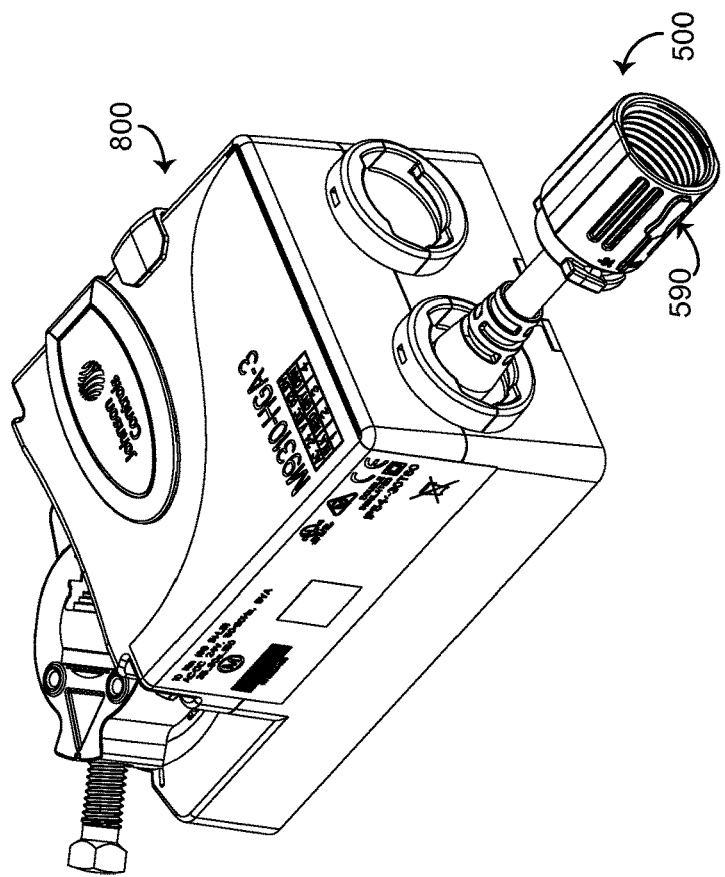
FIGS. 13A-14B are images of the actuator conduit adaptor of FIGS. 1-2 aligned with an actuator conduit, according to an example embodiment.
Figure 13A:
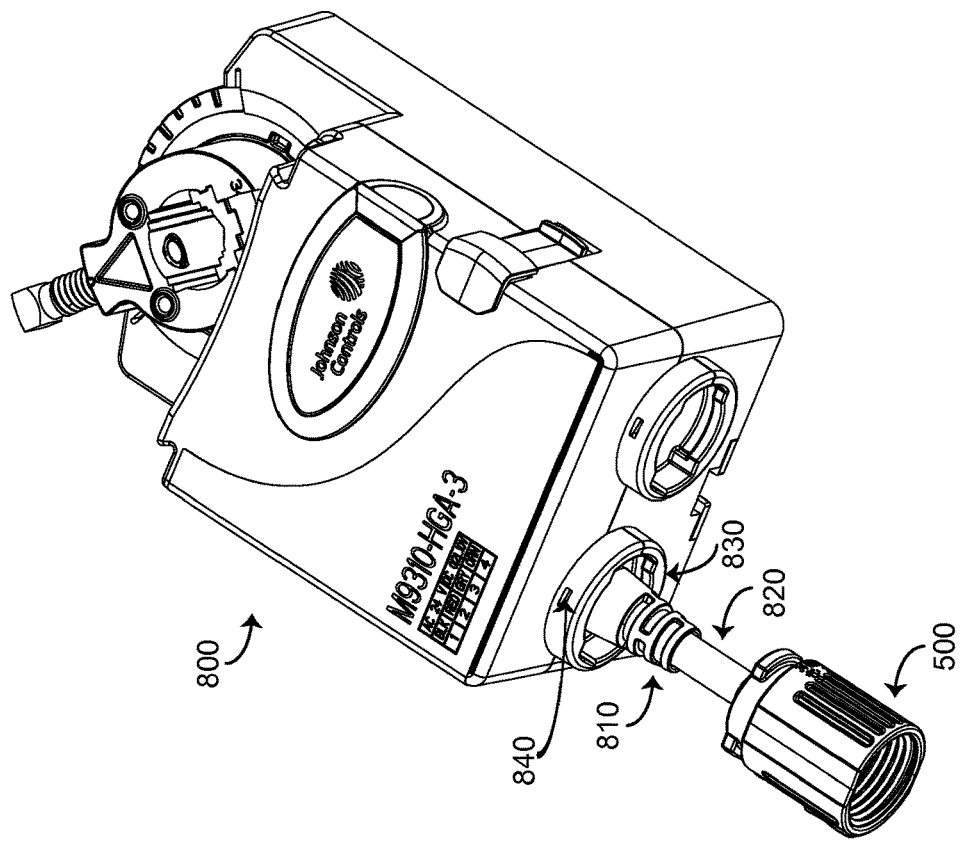
Figure 14B:
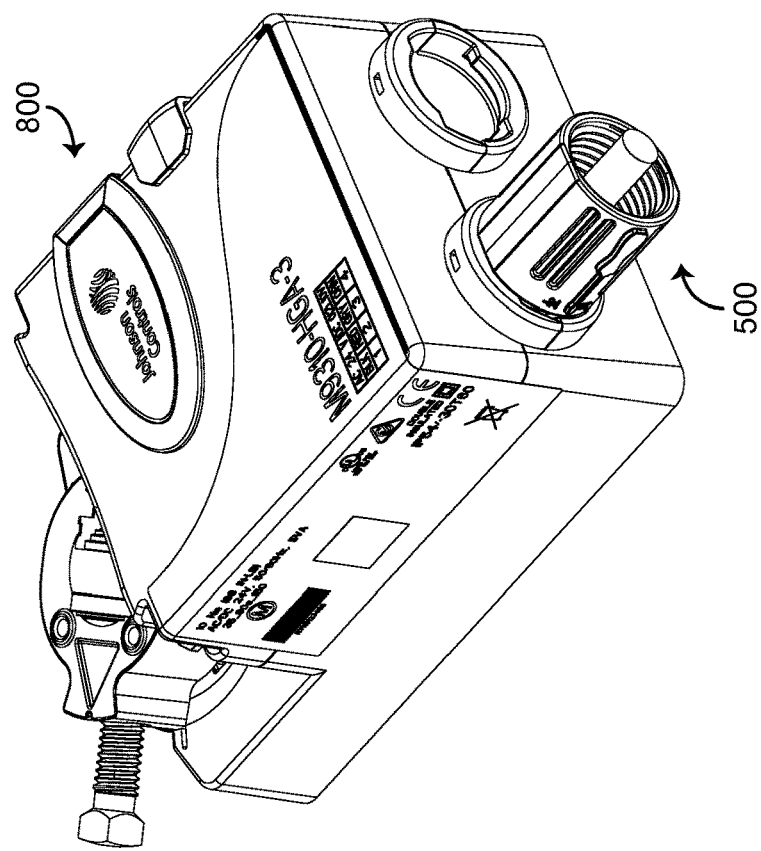
Figure 14A:
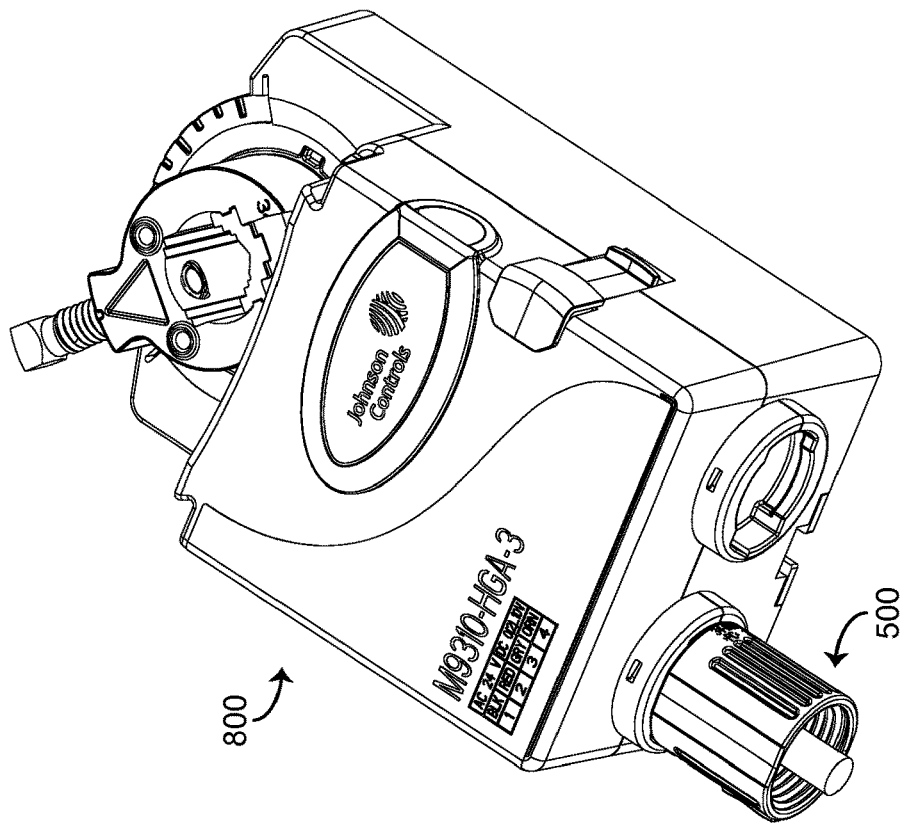
Figure 19B:
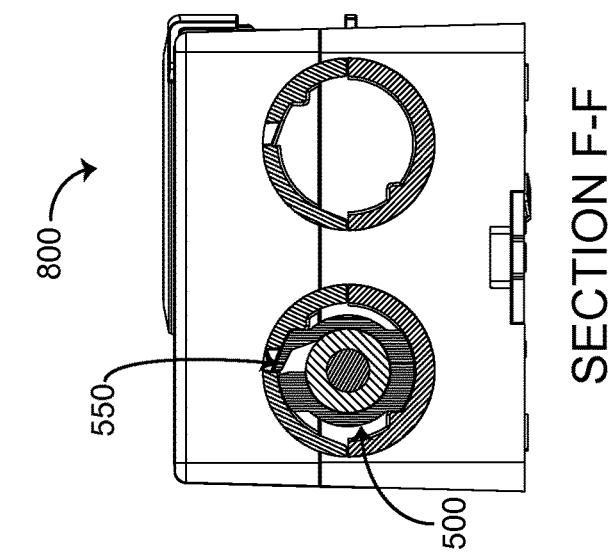
FIGS. 19A-19B are images of the actuator conduit adaptor installed onto an actuator and rotated to lock the conduit adaptor in place, and a cross-sectional view of the actuator along the line labeled "F-F," according to an example embodiment.
Figure 19A:
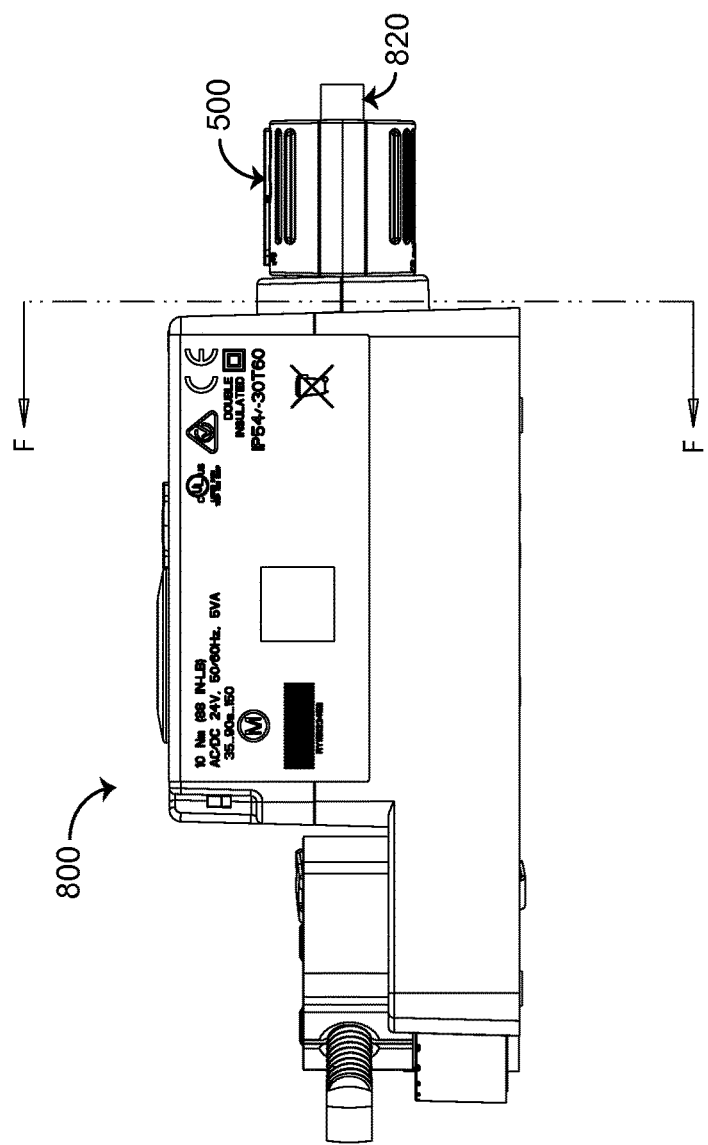

Referring now to FIGS. 13A-15B, further views of conduit adaptor 500 in various assembly states are shown, according to various embodiments. FIGS. 13A-13B depict several perspective views of HVAC component 800, with HVAC component cable 820 providing input and/or output to component 800. Component cable overmold 810 may protrude from HVAC component recess 830 to provide strain relief for component cable 820. As shown in FIGS. 13A-14B, the geometry of conduit adaptor 500 allows the adaptor fit over cable overmold 810 and into component recess 830. Referring now to FIGS. 15A-15B, conduit adaptor 500 may be rotated by a quarter turn (e.g., 90 degrees) to lock the conduit adaptor in place relative to HVAC component 800. As will be described in further detail below, rotating adaptor 500 a quarter turn aligns first tab 530 with HVAC component aperture 840, permitting retention clip 550 to snap into aperture 840. The expansion of retention clip 550 into aperture 840 provides a positive stop which prevents adaptor 500 from further rotation. Locking adaptor 500 into a fully installed position also aligns assembly protrusion 590 with aperture 840, providing a convenient visual indication of the tool required to be inserted into aperture 840 in order to remove conduit adaptor 500 from HVAC component 800.

Referring now to FIGS. 16A-21B, additional views of conduit adaptor 500 in various assembly states with corresponding sectional views are shown, according to various embodiments. FIGS. 16A-16B and 17A-17B depict adaptor 500 in a preliminary installation state on HVAC accessory 700 and HVAC component 800, respectively. As shown in sectional view FIG. 16B, when adaptor 500 is first inserted into HVAC accessory recess 730, retention clip 550 is uncompressed and extends beyond the boundary of recess 730. By contrast, in FIG. 17B, retention clip 550 is compressed within the bounds of HVAC component recess 830. FIGS. 18A-18B and 19A-19B show adaptor 500 in a fully installed state, after rotating adaptor 500 90 degrees in a clockwise direction from its position in FIGS. 16A-17B. As shown in sectional views 18B and 19B, in the fully installed position, retention clip 550 extends partially into HVAC accessory aperture 740 and HVAC component aperture 840, respectively. To remove adaptor 500 from the fully installed position, as described above, the user may insert a tool to compress retention clip 550 until retention clip terminating face 600 makes contact with bottoming surface 610. Once contact is made, adaptor 500 may be rotated 90 degrees in a counterclockwise direction, until it reaches the position depicted in FIGS. 16A-17B, at which point it may be removed from the HVAC component or accessory.

Turning now to FIGS. 20A-20B and 21A-21B, views of adaptor 500 in an incorrect installation orientation are shown, according to various embodiments. In some embodiments, an incorrect installation orientation may occur if a user attempts to install adaptor 500 in an orientation 180 degrees from the correct initiation installation orientation, as depicted and described in FIGS. 16A-17B. As discussed above, the height of assembly protrusion 590 may be selected to prevent an incorrect installation scenario, and first tab 530 and second tab 540 may have different diameters to additionally protect against incorrect installation. Installation in the correct orientation is required to ensure that retention clip 550 may function to lock adaptor 500 in a fully installed position. As shown specifically in FIGS. 20B and 21B, if adaptor 500 is installed in an incorrect orientation, the shape of HVAC accessory aperture 740 and HVAC component aperture 840 and the size of first tab 530 and second tab 540 will prevent adaptor 500 from being rotated into a fully installed position where retention clip 500 may lock adaptor 500 into place.

Figure 22:
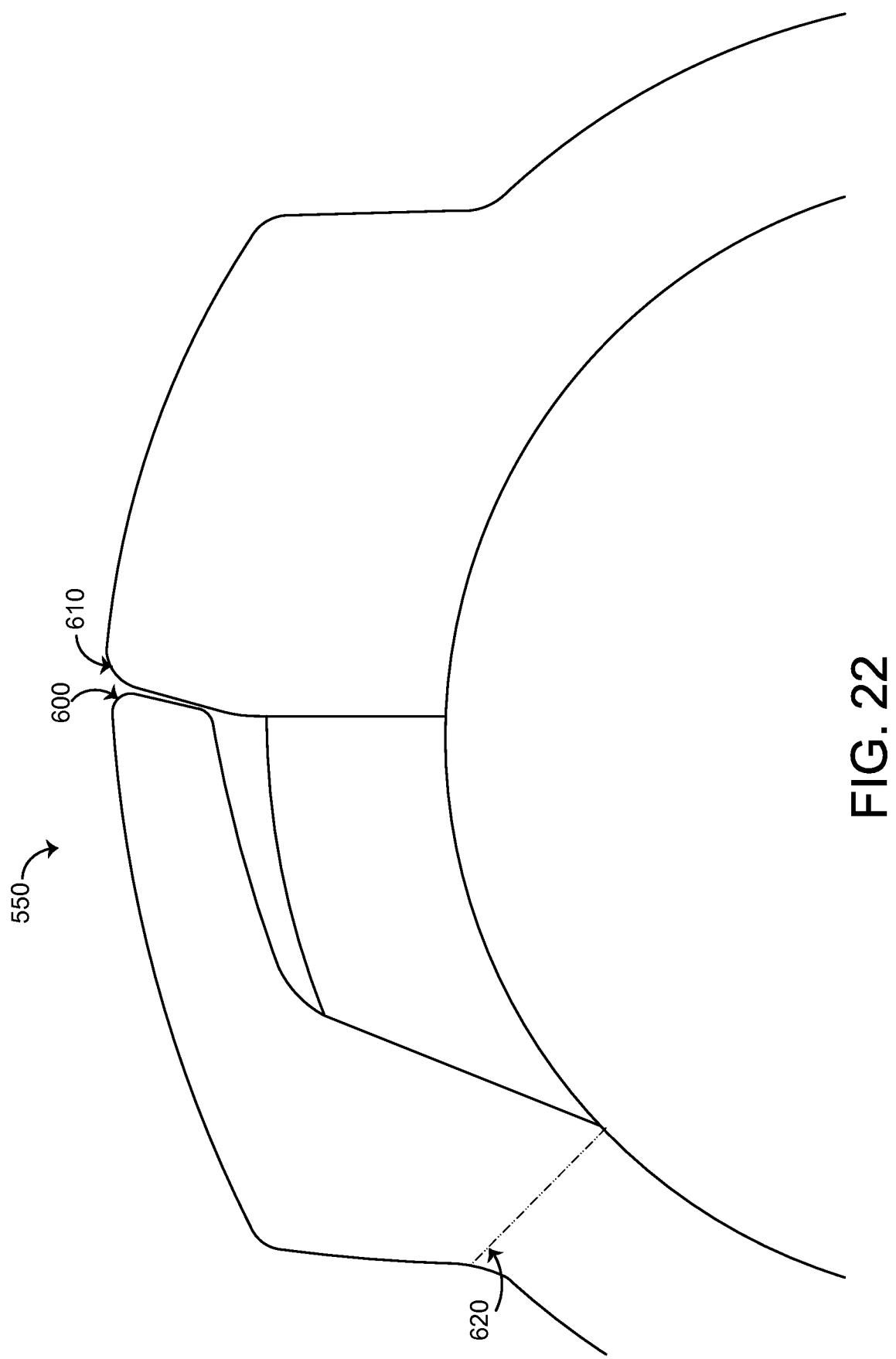
FIG. 22 is an illustration of a snap feature of the actuator conduit adaptor of FIGS. 1-2 which can be used to lock the actuator conduit adaptor onto an actuator adaptor kit or an actuator as shown in FIGS. 12 and 15, according to an example embodiment.

Referring now to FIG. 22, a detail view of retention clip 550 is shown, according to an example embodiment. As described above, terminating face 600 may contact bottoming surface 610 in the presence of a compressive force exerted in a vertically downward direction on retention clip 550 (e.g., a force from an extraction tool). The compressive force causes a resultant stress in the vicinity of terminating face 600. However, in the absence of bottoming surface 610 with the geometry as shown, retention clip 550 would be unrestrained from greater deflection, causing a risk of fracture along line 620.

Figure 23A:
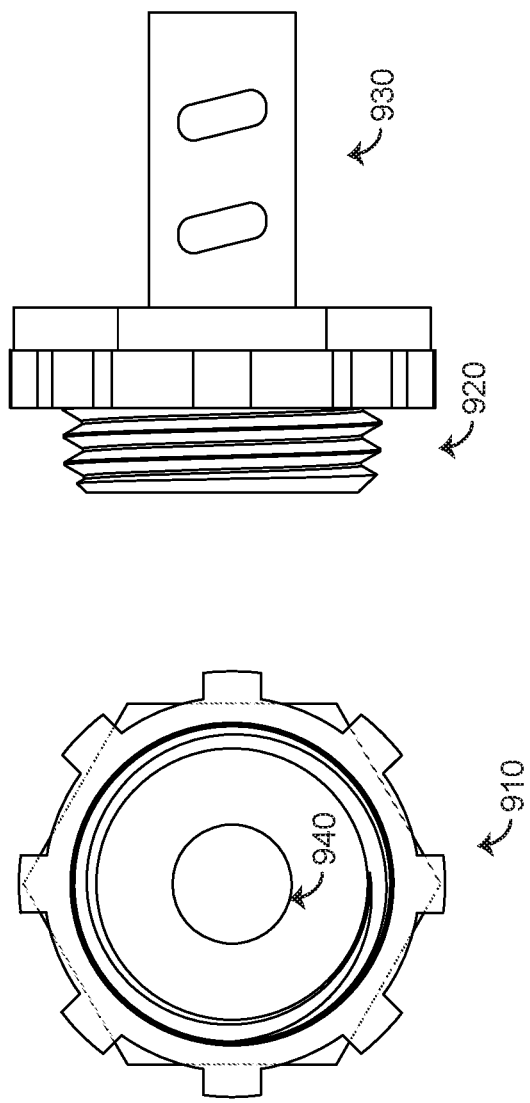
FIGS. 23A-23B are images of a conduit and a threaded conduit fitting that may be utilized with the conduit adaptor of FIGS. 1-2, along to an example embodiment.
Figure 23B:
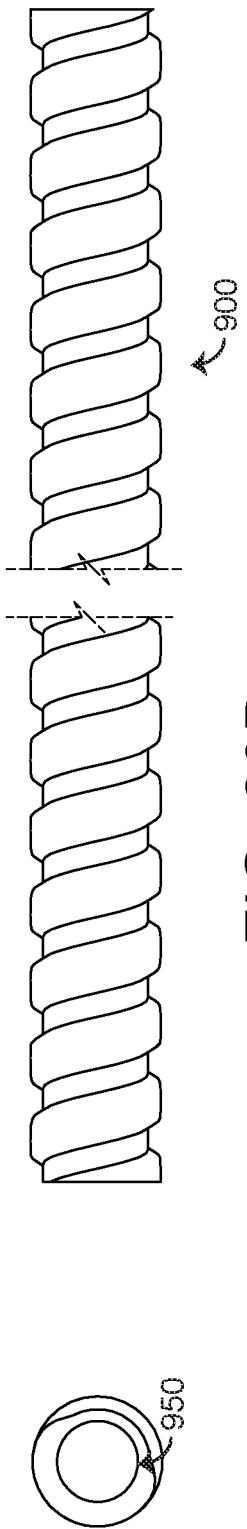

Referring now to FIGS. 23A-23B, conduit 900 and conduit connector 910 that may be utilized with conduit adaptor 500 are shown, according to an example embodiment. Attaching conduit adaptor 500 to the HVAC component (e.g., an actuator) converts the HVAC component into a model that accepts fittings for a conduit (e.g., a flexible metal conduit). Use of conduit adaptor 500 in this manner may facilitate compliance with various regulations for line voltage products.

Still referring to FIG. 23A, several views of a conduit connector 910 are shown, according to an example embodiment. Conduit connector 910 may include a threaded end 920 and a tab end 930. Threaded end 920 may have threads configured to couple with the threaded portion 560 of adaptor 500. The diameter of bore 940 may be sized to permit a cable (e.g., HVAC accessory cable 720, HVAC component cable 820, etc.) to pass through the center of connector 910. The outer diameter of tab end 930 may be sized to permit conduit 900 to fit over the tab. Referring now to FIG. 23B, several views of a conduit 900 are shown, according to an example embodiment. In some embodiments, conduit 900 may be a flexible metal conduit with bore 950 extending through the length of the part. The size of conduit 900 and bore 950 may be selected based on the diameter of the relevant HVAC cable (e.g., HVAC accessory cable 720, HVAC component cable 820, etc.).

Figure 24:
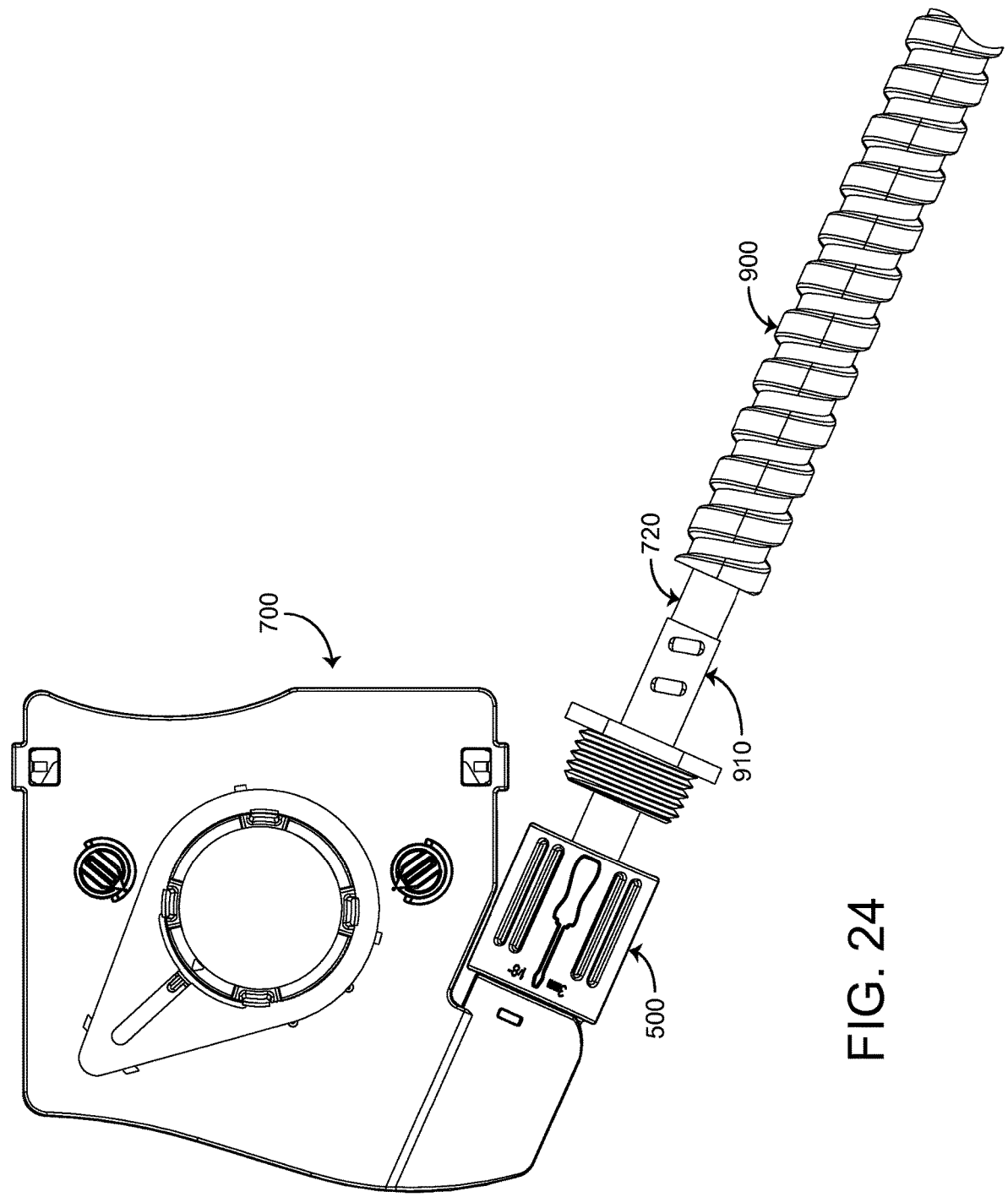
FIG. 24 is an illustration of the conduit and the threaded conduit fitting of FIGS. 23A-23B aligned with the threaded end of the actuator conduit adaptor of FIGS. 1-2, according to an example embodiment.
Figure 25:
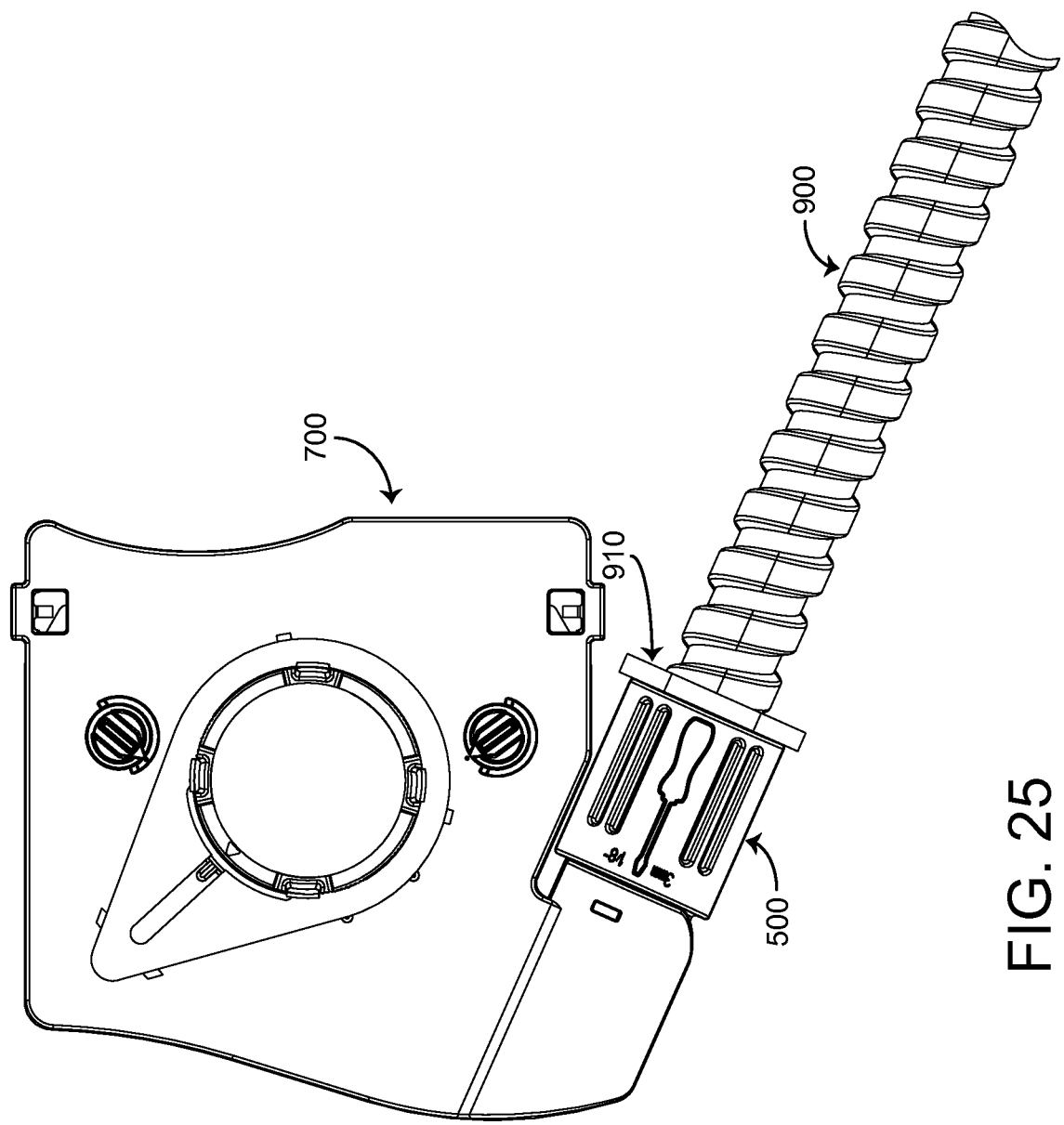
FIG. 25 is an illustration of the conduit and the threaded conduit fitting of FIGS. 23A-23B installed into the threaded end of the actuator conduit adaptor of FIGS. 1-2, according to an example embodiment.

Referring now to FIGS. 24-25, views of conduit 900 and conduit connector 910 in various installation states are shown, according to an example embodiment. Referring specifically to FIG. 24, conduit 900 and conduit connector 910 are depicted in a partially assembled state, with actuator conduit adaptor 500 already fully installed on HVAC accessory 700. As shown, conduit connector 910 may fit over accessory cable 720 before conduit 900 is installed, such that the threaded end 920 is aligned with threaded portion 560 of adaptor 500. Turning now to FIG. 25, once connector 910 has been coupled to adaptor 500, conduit 900 may be fully installed over the tab end 930 of connector 910. In some embodiments, connector 910 may contain right-handed threads, and connector 910 thus may couple to adaptor 500 via clockwise rotation. In some embodiments, adaptor 500 may also be installed via clockwise rotation. This orientation prevents excessive stress on retention clip 550 when conduit connector 910 is installed. In an alternative assembly method, conduit 900 and conduit connector 910 may first be coupled to conduit adaptor 500, and then adaptor 500 may be installed into HVAC accessory 700 or component 800.

Building Management System and HVAC System

Figure 26:
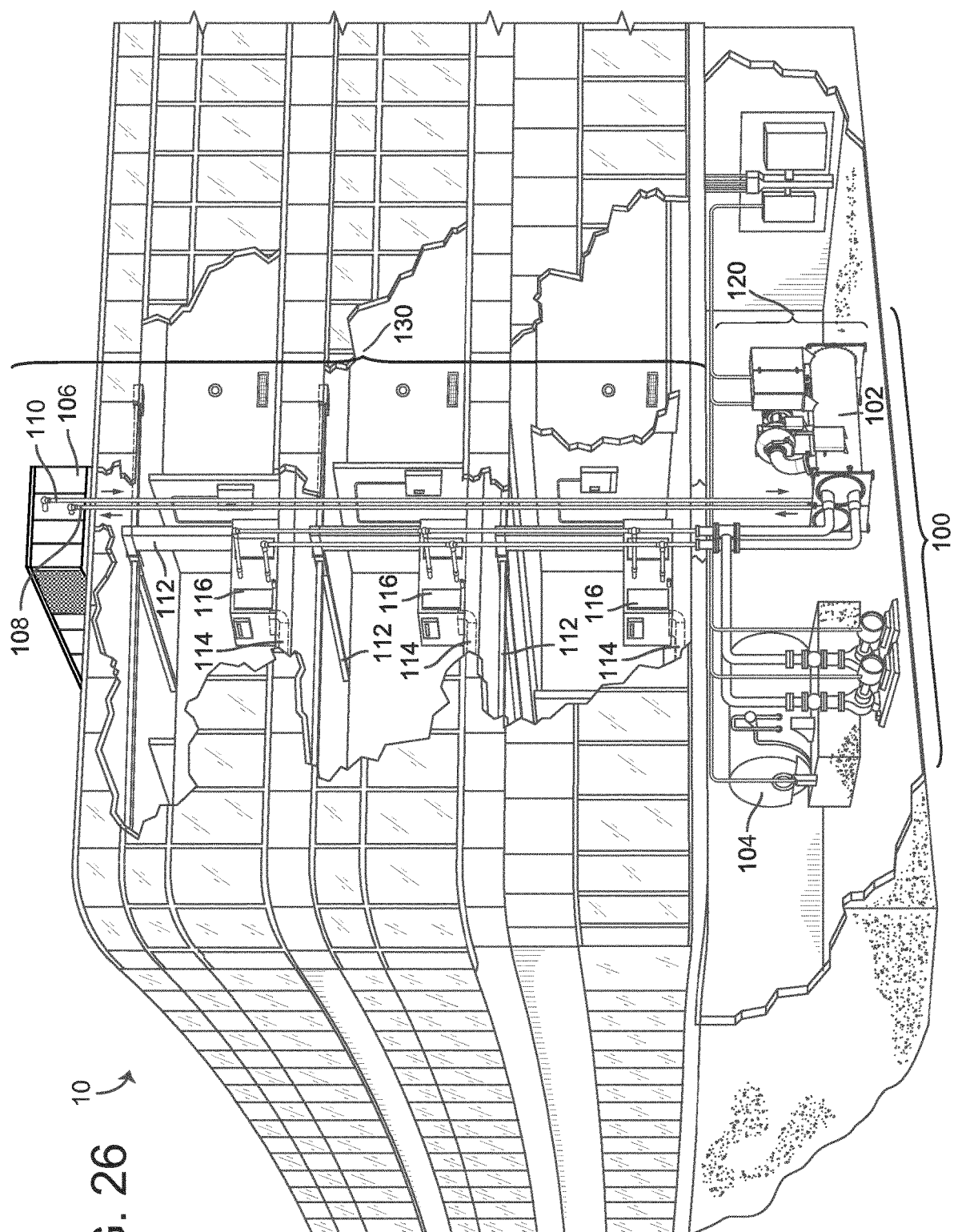
FIGS. 26-29 are drawings of an exemplary HVAC system and building management system (BMS) in which the actuator conduit adaptor of FIGS. 1-2 may be implemented, according to an example embodiment.

Referring now to FIGS. 26-29, an exemplary building management system (BMS) and HVAC system in which the systems and methods of the present invention may be implemented are shown, according to an exemplary embodiment. Referring particularly to FIG. 26, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 27-28.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 17) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 27:
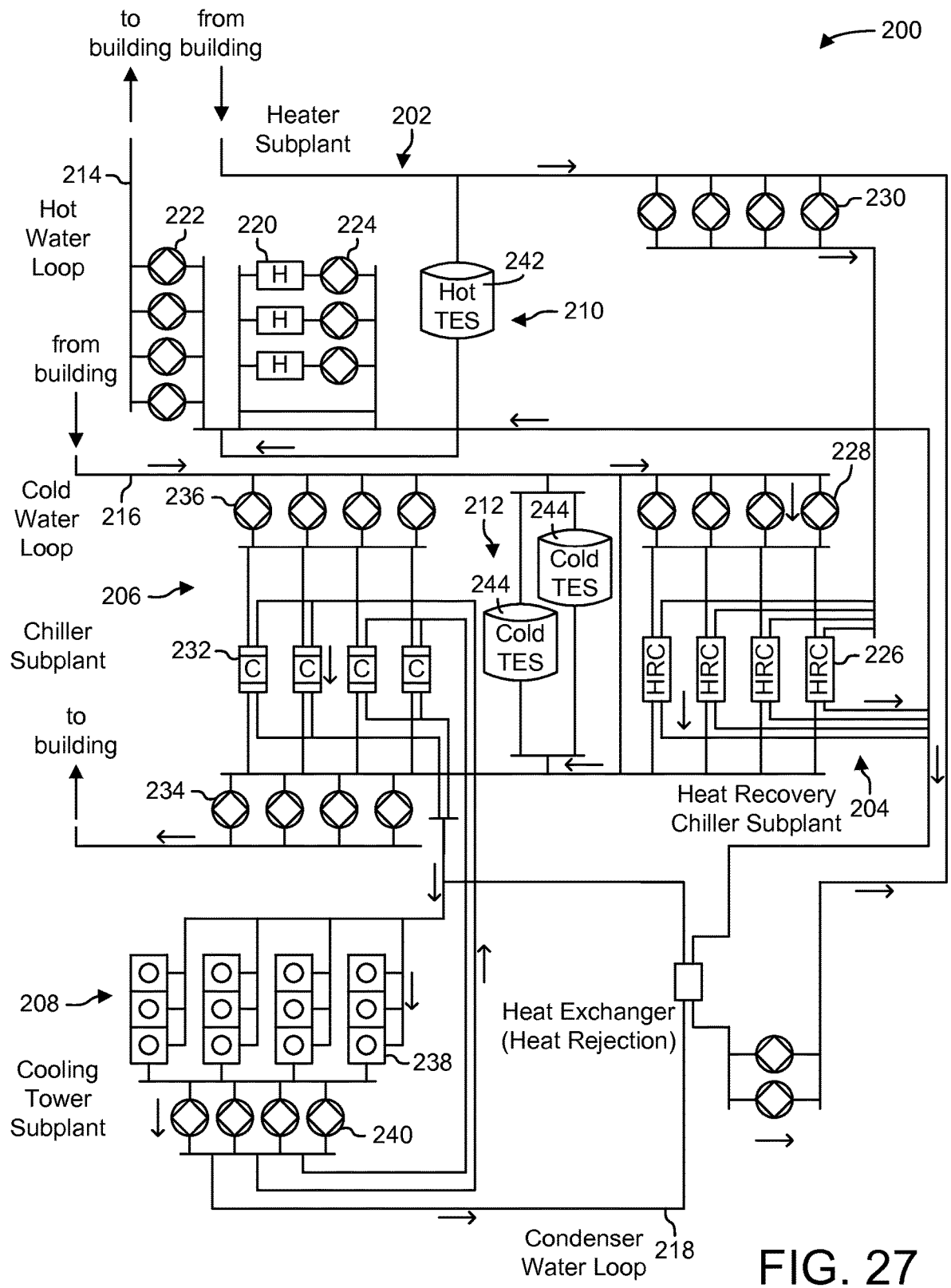

Referring now to FIG. 27, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 27, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 28:
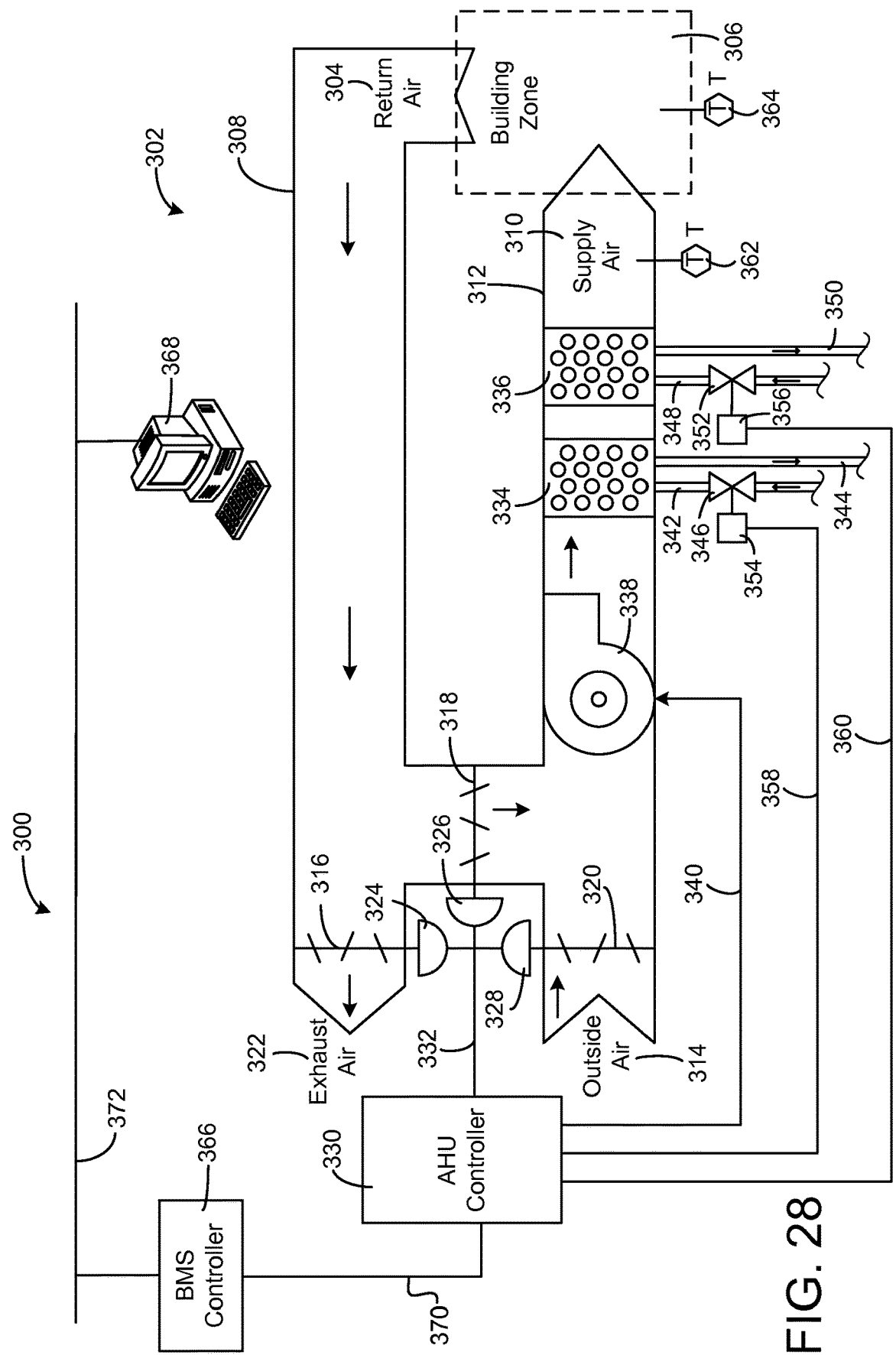

Referring now to FIG. 28, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 28, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 17) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 28, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 28, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 19) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 29:
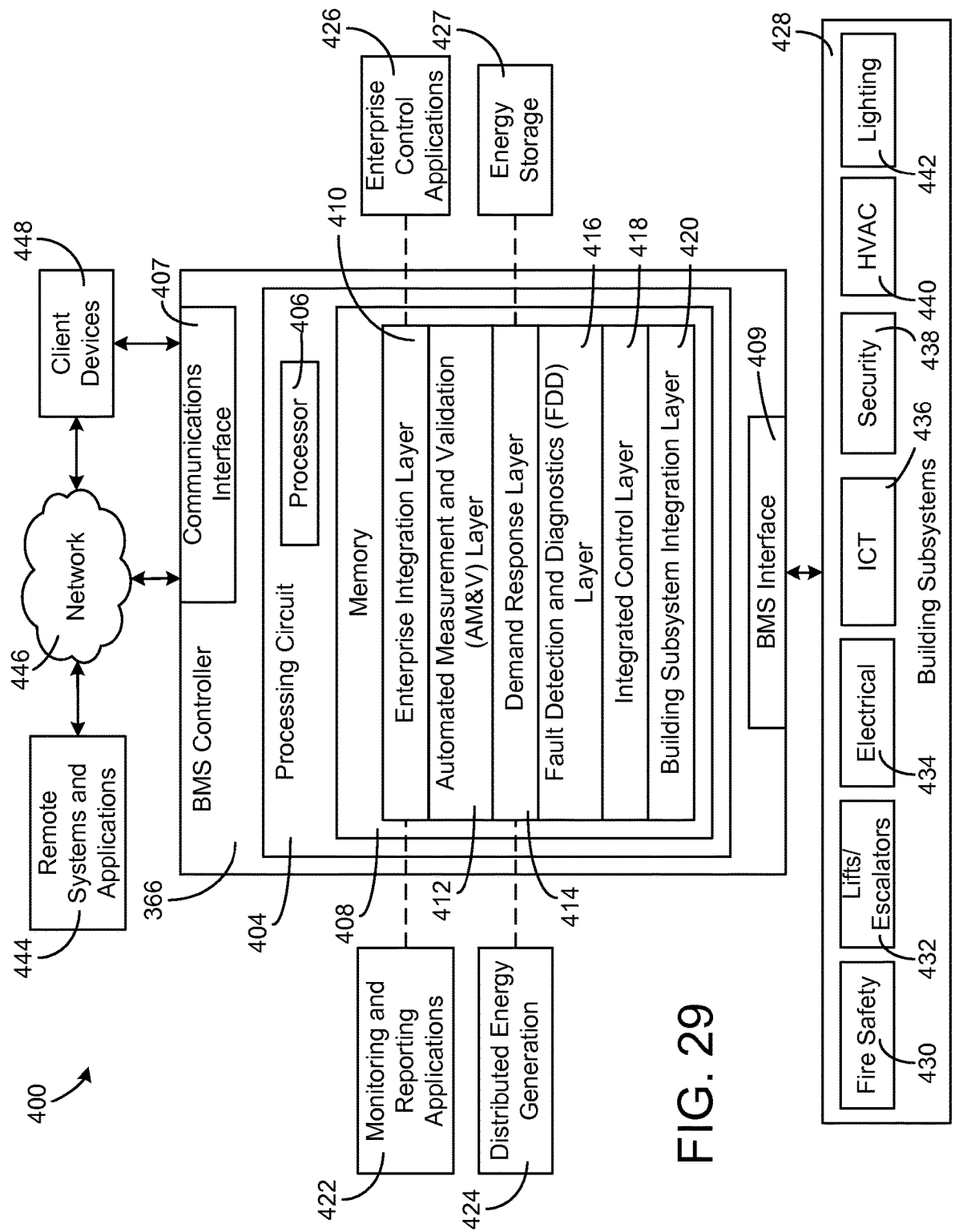

Referring now to FIG. 29, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 27-28.

Each of building subsystems 428 may include any number of devices, controllers, and connections for completing its individual functions and control activities. HVAC subsystem 440 may include many of the same components as HVAC system 100, as described with reference to FIGS. 27-29. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 29, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 29, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 20 shows applications 422 and 426 as existing outside of BMS controller 366, in some embodiments, applications 422 and 426 may be hosted within BMS controller 366 (e.g., within memory 408).

Still referring to FIG. 29, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults or may provide an alert message.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

What is claimed is:

1. A conduit adaptor for an HVAC component, the conduit adaptor comprising:
   a body having a substantially cylindrical shape, a first end configured to fit at least partially within the HVAC component, and a second end configured to couple to a conduit, wherein the body is rotatable relative to the HVAC component between an unlocked position and a locked position when the first end is inserted into the HVAC component;
   a bore extending axially through the body from the first end to the second end, the bore having a first diameter at the first end and a second diameter at the second end, the second diameter larger than the first diameter; and a first tab and a second tab extending radially outward from the first end and configured to prevent the body from being removed from the HVAC component when the body is in the locked position without utilizing a threaded connection, wherein the first tab is integrally formed with the body and includes a retention feature configured to retain the body in the locked position and to be deflected relative to an opening that is at least partially formed in the first tab.

2. The conduit adaptor of claim 1, wherein:
the first tab extends radially outward from the first end by a first radial distance; and
the second tab extends radially outward from the first end by a second radial distance different from the first radial distance.

3. The conduit adaptor of claim 2, wherein the first radial distance is larger than the second radial distance.

4. The conduit adaptor of claim 2, wherein the first radial distance and the second radial distance:
allow the body to be rotated into the locked position when the body is inserted into the HVAC component in a first orientation; and
prevent the body from being rotated into the locked position when the body is inserted into the HVAC component in a second orientation opposite the first orientation.

5. The conduit adaptor of claim 1, wherein the second end includes a threaded portion configured to couple to at least one of a conduit and a conduit adaptor.

6. The conduit adaptor of claim 1, wherein the retention feature is configured to:
deflect radially inward when the body is rotated between the unlocked position and the locked position; and
spring radially outward such that the retention feature extends at least partially into a radial aperture of the HVAC component when the body is in the locked position, the retention feature engaging a surface of the radial aperture to retain the body in the locked position.

7. The conduit adaptor of claim 6, wherein the retention feature is further configured to deflect radially inward when compressed by a tool inserted through the radial aperture of the HVAC component such that the retention feature disengages the surface of the radial aperture and allows the body to rotate into the unlocked position to remove the first end from the HVAC component.

8. The conduit adaptor of claim 7, wherein the first tab further includes a bottoming surface configured to limit an amount by which the retention feature can deflect radially inward to protect the retention feature from plastic deformation or fracture.

9. The conduit adaptor of claim 7, wherein the body comprises an external face including a feature indicating at least one of a shape, size, or type of the tool configured to fit within the radial aperture of the HVAC component.

10. The conduit adaptor of claim 1, wherein the body comprises an external face including features configured to facilitate grip.

11. A conduit adaptor for an HVAC component, the conduit adaptor comprising:
a body having a substantially cylindrical shape, a first end configured to fit at least partially within the HVAC component, and a second end configured to couple to a conduit, wherein the body is rotatable relative to the HVAC component between an unlocked position and a locked position when the first end is inserted into the HVAC component;
a bore extending axially through the body from the first end to the second end, the bore having a first diameter at the first end and a second diameter at the second end, the second diameter larger than the first diameter;
a first tab and a second tab extending radially outward from the first end and configured to prevent the body from being removed from the HVAC component when the body is in the locked position without utilizing a threaded connection, the first tab being integrally formed with the body and comprising a retention clip that is configured to be deflected relative to an opening that is at least partially formed in the first tab; and
at least one indicator feature extending radially outward from an external face of the body and indicating how to disengage the body from the HVAC component.

12. The conduit adaptor of claim 11, wherein the at least one indicator feature has a shape identifying a tool configured to remove the first end from the HVAC component.

13. The conduit adaptor of claim 12, wherein the tool is a screwdriver.

14. The conduit adaptor of claim 11, wherein the at least one indicator feature includes text describing at least one of a size and type of a tool configured to remove the first end from the HVAC component.

15. The conduit adaptor of claim 11, wherein the at least one indicator feature is configured to:
physically prevent the first end from being inserted into the HVAC component in an incorrect orientation by engaging a surface of the HVAC component; and
allow the body to be inserted into the HVAC component in a correct orientation opposite the incorrect orientation.

16. The conduit adaptor of claim 11, wherein the second end includes a threaded portion configured to couple to at least one of a conduit and a conduit adaptor.

17. A conduit adaptor for an HVAC component, the conduit adaptor comprising:
a body having a substantially cylindrical shape, a first end configured to fit at least partially within the HVAC component, and a second end configured to receive a threaded fitting of a conduit through the second end and be threadably coupled to the threaded fitting of the conduit, wherein the body rotates 90 degrees relative to the HVAC component between an unlocked position and a locked position when the first end is inserted into the HVAC component;
a bore extending axially through the body from the first end to the second end; and
a first tab and a second tab extending radially outward from the first end and configured to prevent the body from being removed from the HVAC component when the body is in the locked position;
wherein the first tab and the body are of a unitary construction; and
wherein the first tab includes a retention feature that is configured to retain the body in the locked position and to be deflected relative to an opening that is at least partially formed in the first tab.

18. The conduit adaptor of claim 17, wherein the retention feature is configured to:
deflect radially inward when the body is rotated 90 degrees between the unlocked position and the locked position; and spring radially outward such that the retention feature extends at least partially into a radial aperture of the HVAC component when the body is in the locked position, the retention feature engaging a surface of the radial aperture to retain the body in the locked position.

19. The conduit adaptor of claim 18, wherein the retention feature is further configured to deflect radially inward when compressed by a tool inserted through the radial aperture of the HVAC component such that the retention feature disengages the surface of the radial aperture and allows the body to rotate 90 degrees into the unlocked position to remove the first end from the HVAC component.

\* \* \* \* \*